(12) United States Patent
Murakoshi

(10) Patent No.: US 8,260,108 B2
(45) Date of Patent: Sep. 4, 2012

(54) RECORDING AND REPRODUCTION APPARATUS AND RECORDING AND REPRODUCTION METHOD

(75) Inventor: Sho Murakoshi, Tokyo (JP)

(73) Assignee: Sony Corporation (JP)

(*) Notice: Subject to any disclaimer, the term of this patent is extended or adjusted under 35 U.S.C. 154(b) by 1471 days.

(21) Appl. No.: 11/732,478

(22) Filed: Apr. 3, 2007

(65) Prior Publication Data
US 2007/0248334 A1 Oct. 25, 2007

(30) Foreign Application Priority Data
Apr. 6, 2006 (JP) .............................. P2006-105036

(51) Int. Cl.
*H04N 5/765* (2006.01)
*H04N 5/931* (2006.01)
(52) U.S. Cl. ...................................... 386/200; 386/204
(58) Field of Classification Search .................. None
See application file for complete search history.

(56) References Cited

U.S. PATENT DOCUMENTS

| | | | |
|---|---|---|---|
| 2003/0033603 A1* | 2/2003 | Mori et al. ....................... | 725/46 |
| 2004/0263529 A1* | 12/2004 | Okada et al. ................... | 345/619 |
| 2005/0232489 A1* | 10/2005 | Hosoda et al. ................ | 382/190 |

FOREIGN PATENT DOCUMENTS

| | | | |
|---|---|---|---|
| JP | 2002-112186 | A | 4/2002 |
| JP | 2002-142160 | A | 5/2002 |
| JP | 2005-110016 | A | 4/2005 |
| JP | 2005-302155 | A | 10/2005 |
| JP | 2006-025120 | A | 1/2006 |
| JP | 2006-115052 | A | 4/2006 |

* cited by examiner

*Primary Examiner* — William C Vaughn, Jr.
*Assistant Examiner* — Oluwaseun A Adegeye
(74) *Attorney, Agent, or Firm* — Lerner, David, Littenberg, Krumholz & Mentlik, LLP

(57) ABSTRACT

A recording and reproduction apparatus may include an information signal recording section configured to record an information signal on a recording medium; a reproduction section configured to read/reproduce the information signal; a feature amount detection section configured to detect feature amounts of the information signal to be recorded and/or the reproduced information signal; a division detection section configured to detect divisions of the information signal; a keyword obtaining section configured to obtain a keyword; a keyword recording section configured to record the keywords obtained by the keyword obtaining section; a user operation input detection section configured to detect operation input by a user; a user evaluation value generator configured to generate a user evaluation value; a keyword evaluation value accumulation and storage section configured to accumulate the user evaluation value for each of the keywords and store the accumulated evaluation value; and a recommendation section.

22 Claims, 11 Drawing Sheets

| SETS OF SCENE CHANGE POINTS (SEGMENTATION SECTIONS) | | GROUP OF KEYWORDS | USER EVALUATION VALUE |
|---|---|---|---|
| 0 | 100 | NATIONAL PARK CAR FOUR HOURS RIDE | 0 |
| 100 | 700 | FOODSTUFF RED GREEN PEPPER CUT | +10 |
| 700 | 900 | OPEN-AIR BATH EFFECT TINTED AUTUMNAL LEAVES | +10 |
| 900 | 1500 | BATTER SWING AND MISS STRIKEOUT | -10 |
| 1500 | 2000 | GOURMET RESTAURANT FRENCH | +10 |
| 2000 | 2900 | | -5 |
| ⋮ | ⋮ | ⋮ | ⋮ |

| RANKING | USER EVALUATION VALUE | KEYWORD |
|---|---|---|
| 1 | +80 | OPEN-AIR BATH |
| 2 | +75 | TINTED AUTUMNAL LEAVES |
| 3 | +70 | HOT SPRING |
| 4 | +60 | ××○×× |
| 5 | +55 | △△×○△ |
| 6 | +50 | □△×○× |
| ⋮ | ⋮ | ⋮ |

(ANNOUNCER TANAKA) IT IS A FOUR-HOUR RIDE BY CAR UP TO THE NATIONAL PARK.

| SETS OF SCENE CHANGE POINTS (SEGMENTATION SECTIONS) | | GROUP OF KEYWORDS |
|---|---|---|
| 0 | 100 | NATIONAL PARK  CAR  FOUR HOURS  RIDE |
| 100 | 700 | FOODSTUFF  RED GREEN PEPPER  CUT |
| 700 | 900 | OPEN-AIR BATH  EFFECT  TINTED AUTUMNAL LEAVES |
| 900 | 1500 | BATTER  SWING AND MISS  STRIKEOUT |
| 1500 | 2000 | GOURMET  RESTAURANT  FRENCH |
| 2000 | 2900 | |
| ⋮ | ⋮ | ⋮ |

FIG. 4

| REPRODUCTION MODE | USER EVALUATION VALUE |
|---|---|
| NORMAL REPRODUCTION | 0 |
| FAST FORWARD REPRODUCTION | -5 |
| SKIP REPRODUCTION | -10 |
| REWINDING REPRODUCTION | 10 |

FIG. 5

| SETS OF SCENE CHANGE POINTS (SEGMENTATION SECTIONS) | | GROUP OF KEYWORDS | USER EVALUATION VALUE |
|---|---|---|---|
| 0 | 100 | NATIONAL PARK  CAR  FOUR HOURS  RIDE | 0 |
| 100 | 700 | FOODSTUFF  RED  GREEN PEPPER  CUT | +10 |
| 700 | 900 | OPEN-AIR BATH  EFFECT  TINTED AUTUMNAL LEAVES | +10 |
| 900 | 1500 | BATTER  SWING AND MISS  STRIKEOUT | -10 |
| 1500 | 2000 | GOURMET  RESTAURANT  FRENCH | +10 |
| 2000 | 2900 | | -5 |
| ⋮ | ⋮ | ⋮ | ⋮ |

FIG. 6

| RANKING | USER EVALUATION VALUE | KEYWORD |
|---|---|---|
| 1 | +80 | OPEN-AIR BATH |
| 2 | +75 | TINTED AUTUMNAL LEAVES |
| 3 | +70 | HOT SPRING |
| 4 | +60 | ××○×× |
| 5 | +55 | △△×○△ |
| 6 | +50 | □△×○× |
| ⋮ | ⋮ | ⋮ |

RECORDING AND REPRODUCTION APPARATUS AND RECORDING AND REPRODUCTION METHOD

CROSS-REFERENCE TO RELATED APPLICATIONS

This application claims priority from Japanese Patent Application No. JP 2006-105036 filed in the Japanese Patent Office on Apr. 6, 2006, the entire content of which is incorporated herein by reference.

BACKGROUND OF THE INVENTION

1. Field of the Invention

The present invention relates to a recording and reproduction apparatus and a method for recording and reproducing, for example, an information signal of a television broadcast program.

2. Description of the Related Art

Recording and reproduction apparatuses for recording, for example, television broadcast programs on a recording medium, such as a hard disk or a digital versatile disc (DVD), and for reproducing a recorded television broadcast program have become popular.

In such a recording and reproduction apparatus, when a user desires to cause a recorded television broadcast program or the like to be reproduced and views it, it is very convenient if reproduction candidate programs matching the user's preferences are recommended by the recording and reproduction apparatus.

In Japanese Unexamined Patent Application Publication No. 2002-112186, a method for determining user's preferences on the basis of an electronic program guide (EPG) and viewing history information of the user and for displaying information on reproduction candidate programs to be viewed by the user is disclosed.

SUMMARY OF THE INVENTION

However, in the method disclosed in Japanese Unexamined Patent Application Publication No. 2002-112186, the user is informed of reproduction candidate programs determined on the basis of EPG information and viewing history information in units of programs. Consequently, there is a problem in that it is difficult to recommend and provide a program containing a specific scene matching the user's preferences.

For example, when a certain user has a preference for cooking, in the method of the related art, it is possible to recommend and provide cooking programs. However, even if a so-called slot devoted to cooking (cooking slot; scene) exists in, for example, an entertainment program or a singing program, since the entertainment program in which the cooking slot exists is not listed as a cooking program, it does not become a recommended program.

Furthermore, it is difficult to deal with a request from the user to extract only cooking slots and view them.

In view of the above, it may be desirable to recommend to the user programs containing specific scenes preferred by the user and the specific scenes.

According to a first embodiment of the present invention, there is provided a recording and reproduction apparatus which may include information signal recording means for recording an information signal on a recording medium; reproduction means for reading and reproducing the information signal recorded on the recording medium; feature amount detection means for detecting feature amounts of the information signal to be recorded and/or the reproduced information signal; division detection means for detecting divisions of the information signal by using the feature amounts detected by the feature amount detection means; keyword obtaining means for obtaining a keyword for each of a plurality of segmentation sections of the signal information, the keyword being associated with the segmentation section and each of the segmentation sections being specified by two adjacent divisions detected by the division detection means; keyword recording means for recording, for each segmentation section, the keywords obtained by the keyword obtaining means on the recording medium in such a manner as to correspond to each of the segmentation sections of the information signal; user operation input detection means for detecting operation input by a user; user evaluation value generation means for generating a user evaluation value on the basis of the operation input so as to correspond to each of the segmentation sections in such a manner that the operation input by the user is monitored by monitoring detection output of the user operation input detection means and a user evaluation value in a negative direction is assigned to operation input that does not request that the information signal be normally reproduced; keyword evaluation value accumulation and storage means for accumulating the user evaluation value for each of the keywords and storing the accumulated evaluation value for each of the keywords in such a way that the user evaluation value for each of the segmentation sections, generated by the user evaluation value generation means, is associated with the evaluation value of the keyword of the segmentation section; and recommendation means for referring to the evaluation values of the keywords stored in the keyword evaluation value accumulation and storage means in order to detect the information signal or the segmentation section having a keyword having a large evaluation value as the keyword of the segmentation section from within the information signals or the segmentation sections recorded on the recording medium, and for recommending the information signal or the segmentation section to the user.

In the recording and reproduction apparatus according to the first embodiment of the present invention, when a user inputs an operation request such as one requesting a fast forward reproduction operation or skip instruction operation such that normal reproduction is not performed, a negative user evaluation value may be assigned to the segmentation section of the information signal at which the user may input an operation request requesting non-normal reproduction, and a more positive user evaluation value may be assigned to a preference section for which the user desires reproduction more.

A user evaluation value for each of the segmentation sections may be accumulated for each of a plurality of keywords in such a manner that each of the user evaluation values corresponds to the evaluation value of the keyword at each segmentation section, and the accumulated user evaluation values for the keywords may be stored in the keyword evaluation value accumulation and storage means. Therefore, a keyword having a high user evaluation value among the keywords stored in the keyword evaluation value accumulation and storage means may be a keyword related to a scene preferred by the user.

On the other hand, the information signal may be recorded together with the keyword for each segmentation section on a recording medium. The recommendation means may detect a segmentation section containing a keyword having a high user evaluation value related to a scene preferred by the user or an information signal containing the segmentation section from among the keywords stored in the keyword evaluation value accumulation and storage means, and may recommend it to the user.

When a television broadcast program is taken as an example, the presented segmentation section may have a high possibility of being a scene preferred by the user. Furthermore, a program containing the segmentation section may have a high possibility of being a program containing a scene preferred by the user. Therefore, in the recording and reproduction apparatus according to a first embodiment of the present invention, a scene preferred by the user or a program containing a scene preferred by the user among the recorded information signals may be recommended to the user.

According to a second embodiment of the present invention, there is provided a recording and reproduction apparatus which may include information signal recording means for receiving an information signal transmitted via a communication network and recording the information signal on a recording medium; reproduction means for reading and reproducing the information signal recorded on the recording medium; feature amount detection means for detecting feature amounts of the information signal to be recorded and/or the reproduced information signal; division detection means for detecting divisions of the information signal by using the feature amounts detected by the feature amount detection means; keyword obtaining means for obtaining a keyword for each of a plurality of segmentation sections of the signal information, the keyword being associated with the segmentation section and each of the segmentation sections being specified by two adjacent divisions detected by the division detection means; keyword recording means for recording, for each segmentation section, the keywords obtained by the keyword obtaining means on the recording medium in such a manner as to correspond to each of the segmentation sections of the information signal; user operation input detection means for detecting operation input by a user; user evaluation value generation means for generating a user evaluation value on the basis of the operation input so as to correspond to each of the segmentation sections in such a manner that the operation input by the user is monitored by monitoring detection output of the user operation input detection means and a user evaluation value in a negative direction is assigned to operation input that does not request that the information signal be normally reproduced; keyword evaluation value accumulation and storage means for accumulating the user evaluation value for each of the keywords and storing the accumulated evaluation value for each of the keywords in such a way that the user evaluation value for each of the segmentation sections, generated by the user evaluation value generation means, is associated with the evaluation value of the keyword of the segmentation section; scheduling information obtaining means for receiving transmission scheduling information containing information in the form of character information related to the information signal transmitted via the communication network; and recommendation means for detecting an information signal scheduled to be transmitted, the information signal containing a keyword having a large evaluation value among the evaluation values of the keywords stored in the keyword evaluation value accumulation and storage means, within the character information contained in the transmission scheduling information obtained by the scheduling information obtaining means, and for recommending the information signal to the user.

In the recording and reproduction apparatus according to a second embodiment of the present invention, a keyword having a high user evaluation value among the keywords stored in the keyword evaluation value accumulation and storage means may be a keyword related to a scene preferred by the user, identical to the recording and reproduction apparatus according to the first embodiment of the present invention.

In the recording and reproduction apparatus according to the second embodiment of the present invention, the recommendation means may detect an information signal scheduled to be transmitted, which contains a keyword having a high user evaluation value related to a scene preferred by the user from among the keywords stored in the keyword evaluation value accumulation and storage means, within character information contained in information contained in the information signal scheduled to be transmitted, such as EPG data, and may recommend the information signal scheduled to be transmitted.

According to a second embodiment of the present invention, there is provided a recording and reproduction apparatus which may include information signal recording means for recording an information signal on a recording medium; reproduction means for reading and reproducing the information signal recorded on the recording medium; feature amount detection means for detecting feature amounts of the information signal to be recorded and/or the reproduced information signal; division detection means for detecting divisions of the information signal by using the feature amounts detected by the feature amount detection means; keyword obtaining means for obtaining a keyword for each of a plurality of segmentation sections of the signal information, the keyword being associated with the segmentation section and each of the segmentation sections being specified by two adjacent divisions detected by the division detection means; keyword recording means for recording, for each segmentation section, the keywords obtained by the keyword obtaining means on the recording medium in such a manner as to correspond to each of the segmentation sections of the information signal; user operation input detection means for detecting operation input by a user; user evaluation value generation means for generating a user evaluation value on the basis of the operation input so as to correspond to each of the segmentation sections in such a manner that the operation input by the user is monitored by monitoring detection output of the user operation input detection means and a user evaluation value in a negative direction is assigned to operation input that does not request that the information signal be normally reproduced; keyword evaluation value accumulation and storage means for accumulating the user evaluation value for each of the keywords and storing the accumulated evaluation value for each of the keywords in such a way that the user evaluation value for each of the segmentation sections, generated by the user evaluation value generation means, is associated with the evaluation value of the keyword of the segmentation section; reproduction control means for controlling a reproduction mode for the segmentation section or a reproduction mode of the information signal containing the segmentation section on the basis of the keyword for each of the segmentation sections recorded on the recording medium and the evaluation value of the keyword stored in the keyword evaluation value accumulation and storage means.

Also, in the recording and reproduction apparatus according to a third embodiment of the present invention, a keyword having a high user evaluation value among the keywords stored in the keyword evaluation value accumulation and storage means may be a keyword related to a scene preferred by the user, identical to the recording and reproduction apparatus according to the first and second embodiments of the present invention.

In the recording and reproduction apparatus according to the third embodiment of the present invention, the reproduction control means may perform, for example, normal reproduction of an information signal read from a recording medium for a segmentation section containing a keyword having a high evaluation value related to a scene preferred by the user among the keywords stored in the keyword evaluation value accumulation and storage means, and may perform reproduction control of fast forwarding, skipping, and the like for the other segmentation sections.

According to the embodiments of the present invention, when a television broadcast program is taken as an example, a scene preferred by the user or a program containing a scene preferred by the user may be recommended. Therefore, it may be possible to record or reproduce only a scene preferred by the user or only a program containing such a scene.

BRIEF DESCRIPTION OF THE DRAWINGS

FIG. 4 is a table used to describe the recording and reproduction apparatus according to the embodiment of the present invention;

FIG. 5 is a table used to describe the recording and reproduction apparatus according to the embodiment of the present invention;

FIG. 6 is a table used to describe the recording and reproduction apparatus according to the embodiment of the present invention;

DETAILED DESCRIPTION

Figure 1:
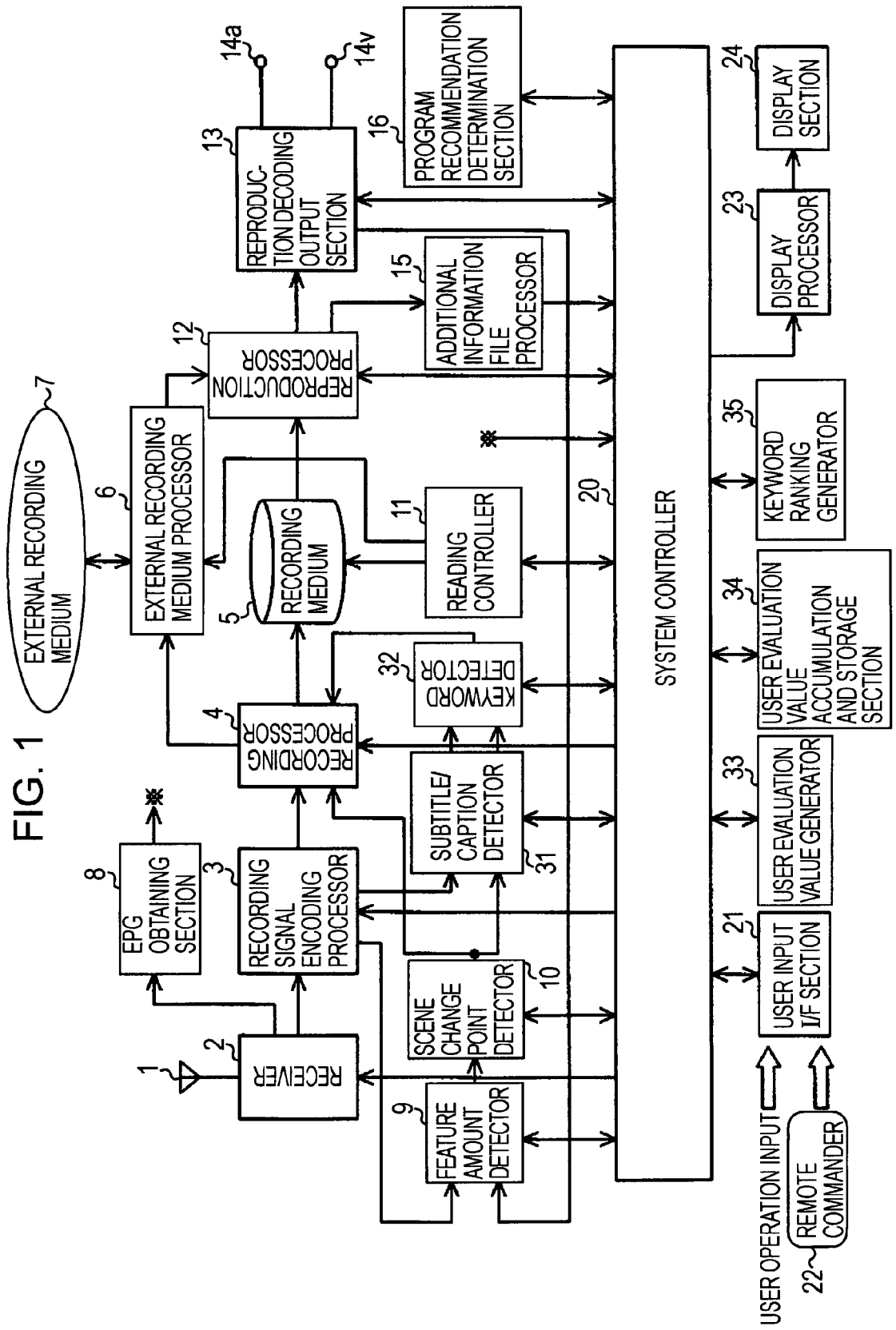
FIG. 1 is a block diagram showing an example of the hardware configuration of a recording and reproduction apparatus according to an embodiment of the present invention.

Embodiments of a recording and reproduction apparatus and a recording and reproduction method according to the present invention will be described below with reference to the drawings.

In the embodiments to be described below, an information signal to be reproduced or recorded is assumed to include, for example, a video signal and an audio signal of a received television broadcast program. The embodiments to be described below are examples in which the present invention is applied to a recording and reproduction apparatus, and a reproduction apparatus and a reproduction method are embodied in the reproduction system of such a recording and reproduction apparatus. Furthermore, the recording and reproduction apparatus of the embodiments to be described below is of a type in which the recording and reproduction apparatus receives a terrestrial digital television broadcast.

[First Embodiment]

A recording and reproduction apparatus according to a first embodiment of the present invention has functions for recording an information signal formed of a video signal and an audio signal of a received television broadcast program on an internal recording medium constituted by an incorporated hard disk device or an external recording medium such as a DVD and for reading and reproducing an information signal recorded on an incorporated hard disk device or an external recording medium.

The recording and reproduction apparatus has functions for recording a video signal and an audio signal of a television broadcast program on an incorporated hard disk device or an external recording medium and for reproducing a video signal and an audio signal recorded on these recording media, and furthermore has functions for detecting the amount of features of a video signal and an audio signal of a television broadcast program to be recorded, or a reproduced video signal and a reproduced audio signal, for detecting a scene change point as a feature point on the basis of the output of the detection, and for recording the information on the detected scene change point together with the information signal of the television broadcast program on a recording medium.

In this embodiment, the data of the detected feature point (data of the scene change point) is recorded in a predetermined recording area as an additional information file for the recorded broadcast program. The starting point and the ending point of a broadcast program, the starting point of a commercial (hereinafter abbreviated as a "CM"), or the like may be generated as chapter points, and a data list in which the generated chapter points are scene change points may be recorded on a recording medium.

Here, the scene change point corresponds to a division of an information signal, and may be not only a division between, for example, a program main body and a CM, the starting point and the ending point of a program CM in the program main body, the starting point and the ending point at the section of a program opening and a program ending, but also a scene change point in which the scene greatly changes (a so-called scene change). Furthermore, in this embodiment, when a plurality of CMs are continuously shown, the starting point and the ending point of each CM can also be detected as scene change points.

In the description of this embodiment, the section of information signals (a video signal and an audio signal) of a television broadcast program specified by adjacent scene change points, that is, the section between adjacent scene change points (hereinafter referred to as a "segmentation section") will be referred to as a scene.

[Hardware Configuration of Recording and Reproduction Apparatus According to First Embodiment]

FIG. 1 is a block diagram showing an example of the hardware configuration of a recording and reproduction apparatus according to the first embodiment.

In FIG. 1, a system controller 20 is configured to include a microcomputer, controls various kinds of modes, and controls other operations in the recording and reproduction apparatus.

In response to an operation request input by a user, for example, by using a remote commander 22 or via an operation button of the recording and reproduction apparatus, operation request information is supplied to the system controller 20 via a user input interface section 21. The system controller 20 determines what operation request information is input and performs a process corresponding to the input operation request information.

A display section 24 formed of, for example, an LCD (Liquid-Crystal Display) device or the like is connected to the system controller 20 via a display processor 23, so that display information serving as a reference can be displayed when a user inputs an operation request. The user can input various kinds of operation requests while viewing the display of the display section 24.

<Recording System Process>

First, the recording system of the recording and reproduction apparatus according to this embodiment will be described with reference to FIG. 1.

When a user inputs a command for instructing recording, for example, by using the remote commander 22 or via the operation button of the recording and reproduction apparatus, the operation information is supplied to the system controller 20 via the user input interface section 21. Under the control of the system controller 20, the recording and reproduction apparatus performs a recording process described below.

In this example, a receiver 2 includes a television tuner, a descrambler, a transport stream (TS) decoder, and video and audio decoders for the purpose of receiving a terrestrial digital television broadcast.

Prior to inputting the above-mentioned command for instructing recording, the user performs a station selection operation by using the remote commander 22 or via the operation button of the recording and reproduction apparatus. Then, the operation information is supplied to the system controller 20 via the user input interface section 21, and the system controller 20 supplies the station selection control information used to select a broadcast channel corresponding to the station selection operation performed by the user to the receiver 2. During the station selection, the system controller 20 displays a broadcast channel being selected on the display section 24 via the display processor 23. Therefore, the user performs a station selection operation while viewing the display of the display section 24.

Upon receiving the station selection control information, the receiver 2 selectively extracts the broadcast program of the broadcast channel selected by the user from the television broadcast waves received by a receiving antenna 1 and decodes a video signal and an audio signal from the selectively extracted broadcast waves.

The video signal and the audio signal that are selectively extracted and decoded by the receiver 2 are supplied to a recording signal encoding processor 3, where an A/D (Analog to Digital) conversion process is performed on the signals at a predetermined sampling frequency and at a predetermined number of quantization bits, and the converted video signal and the converted audio signal are subjected to a recording encoding process.

Here, as a recording encoding process, a data compression process is performed on a digital audio signal by using a predetermined band compression method, such as MPEG audio or AC-3 audio (Dolby AC-3 or Audio Code Number 3). On a digital video signal, as a recording encoding process, a predetermined band compression process, such as MPEG video or wavelet conversion, is performed. Then, the video data on which a data compression process has been performed is multiplexed with the compressed audio data and is recorded on an incorporated recording medium 5 via a recording processor 4.

Furthermore, when the user has instructed recording onto a removable external recording medium 7 rather than onto the incorporated recording medium 5, in response to a control signal from the system controller 20, the recording processor 4 records the multiplexed data from the recording signal encoding processor 3 on the external recording medium 7 via an external recording medium processor 6.

At this time, identification information (referred to as recording program identification information) is attached to a broadcast program to be recorded. The compressed video signal and the compressed audio signal, attached with the recording program identification information, are recorded on the recording medium 5 and the external recording medium 7. The recording program identification information is used for searching during reproduction.

Here, the incorporated recording medium 5 is formed of a hard disk device in this example. The external recording medium 7 is a DVD in this example.

In a terrestrial digital television broadcast, information on subtitles and captions that is broadcast using a closed caption is also sent to the recording signal encoding processor 3, and is recorded together with the video signal and the audio signal on the recording medium 5 or the external recording medium 7 in such a manner as to be associated with the recording program identification information.

In the recording and reproduction apparatus of this example, in the receiver 2, service information on a broadcast program is extracted, and the extracted information is supplied to an EPG (Electronic Program Guide) obtaining section 8. The EPG obtaining section 8 generates EPG data on the basis of the received service information on the broadcast program and inputs the EPG data to the system controller 20.

The digital video signal and the digital audio signal from the recording signal encoding processor 3 are supplied to the feature amount detector 9, where the amounts of various kinds of predetermined features are detected and the detected feature amounts are supplied to a scene change point detector 10.

As detection of the feature amounts performed by the feature amount detector 9, for detecting a division between a program main body and a CM and the starting point and the ending point of each of a plurality of CMs when the plurality of CMs are continuously shown, detection of a no-sound section, detection of a black level section, and the like are used. Furthermore, since the duration of a CM section is a multiple of 15 seconds like 15 seconds, 30 seconds, 45 seconds, or 60 seconds, whether the duration of a no-sound section and a black level section is a multiple of 15 seconds is used to detect a CM section.

For detecting other feature amounts, detection of a scene change, detection of a telop, detection of a person, detection of a flesh color, detection of dialogue, detection of music, detection of liveliness, and the like are used. Here, detection of liveliness is performed by detecting the fact that there is a sudden change in the sound volume from a quiet state or there is much clapping.

That is, in this example, in the feature amount detector 9, on the basis of various kinds of video characteristic data, audio characteristic data, and predetermined parameter data, a process for extracting various kinds of features of predetermined telop feature data (telop section determination data), person feature data and other image feature data (image feature section determination data), speaker audio feature data (speaker audio determination data), clapping cheer feature data (clapping cheer determination data), and other audio feature data (audio feature section determination data) is performed.

Data obtained in the middle of a data compression process from the recording signal encoding processor 3 is input to the feature amount detector 9. In this example, as will be described later, by considering that feature amount detection is also performed for a reproduction signal and a scene change point is detected, the feature amount is detected by the feature amount detector 9 and the scene change point is detected by using data obtained during the data compression process.

As a result of the above, when the feature amount is detected and the scene change point is detected for a reproduction signal, it is not necessary to completely compress the reproduction signal so that it is returned to the original digital audio signal and the original digital video signal, and feature amount detection and scene change point detection can be performed using data in the middle of the compression decoding process, presenting the merit such that the detection process can be performed in a shorter time.

The scene change point detector 10 detects the scene change point on the basis of the feature amount detected by the feature amount detector 9. In this case, as described above, the scene change point detector 10 detects, as a scene change point (feature point) serving as a division, for example, a division between a program main body and a CM, the starting point and the ending point of a section of a program CM within a program main body, the starting point and the ending point of a section at a program opening and a program ending, a scene change point at which the scene greatly changes within a program main body, the starting point and the ending point of each CM when a plurality of CMs continue, etc. In the case of this example, data such that the scene change point is detected is position information of the starting point and the ending point of a scene (for example, a frame number (or a field number) when the beginning position of a broadcast program containing a CM is used as a reference), such as a CM, a program main body, program opening, or program ending.

When information, such as the program title and the genre of the program, is contained in the received broadcast program, the feature amount detector 9 also detects the program title and the genre of the program as the feature amounts, and sends them to the scene change point detector 10. Therefore, the scene change point detector 10 detects a scene change point by also using the program title and the genre of the program.

Then, the position data of the scene change point from the scene change point detector 10 is supplied to the recording processor 4, whereby a recording process is performed by the recording processor 4, and the position data is recorded in a predetermined recording area of the recording medium 5, which is an area of an additional information file in this example. Alternatively, the position data of the scene change point obtained by the scene change point detector 10 is supplied from the recording processor 4 to the external recording medium processor 6, whereby a recording process is performed by the external recording medium processor 6, and the position data is recorded in a predetermined recording area of the external recording medium 7, which is an area of the additional information file in this example.

In this case, the position data of the scene change point is recorded in an area of the additional information file in such a manner as to correspond to the video data and the audio data of the corresponding broadcast program in accordance with the above-mentioned recording program identification information.

In this embodiment, the position data of the scene change point corresponds to the frame position (or the field position) of the video data with respect to a block of the recorded broadcast program by using, for example, a frame number (or a field number) of the recorded broadcast program.

The recording signal encoding processor 3 supplies the information of the subtitles and captions that are broadcast using a closed caption, contained in the signal from the receiver 2, to a subtitle/character detector 31. The scene change point detector 10 supplies the position data of the detected scene change point to the subtitle/character detector 31.

Figures 2, 3:
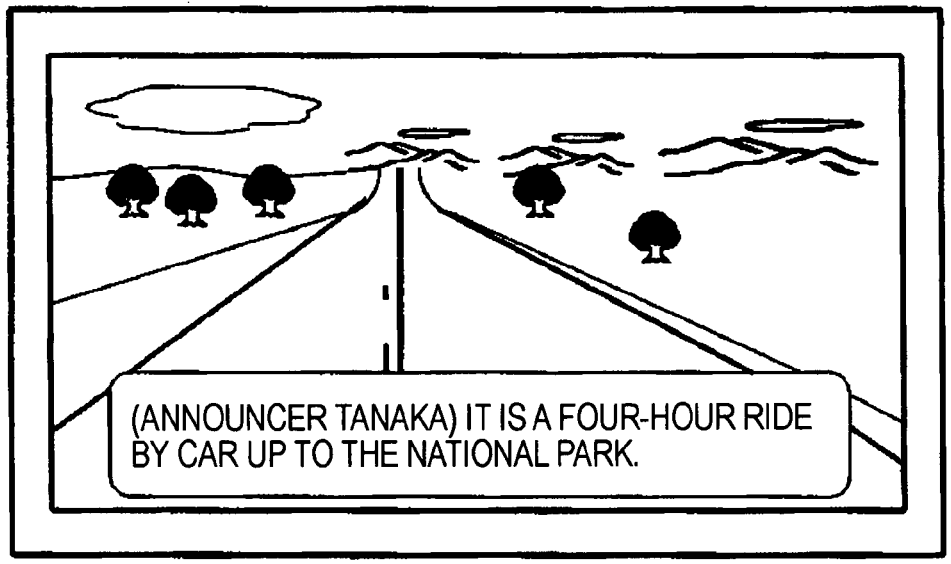
FIG. 2 is a view used to illustrate the recording and reproduction apparatus according to the embodiment of the present invention.
FIG. 3 is a table used to describe the recording and reproduction apparatus according to the embodiment of the present invention.

In a terrestrial digital television broadcast, character text information related to each scene is transmitted as subtitles and captions using a closed caption. This is used for the purpose of the convenience of, for example, a person hard of hearing. In a receiving apparatus of a terrestrial digital television broadcast, when operation for setting subtitles on is performed by the user, for example, subtitles and captions are displayed as shown in FIG. 2, and when subtitles are set off, such subtitles and captions are not displayed on the screen.

The subtitle/character detector 31 recognizes a scene (segmentation section) as adjacent scene change points received from the scene change point detector 10, and detects information on the subtitles and captions associated with each scene. Then, the subtitle/character detector 31 supplies the information on the scene change points of the scene starting and ending points of the recognized scene and the information on the subtitles and captions associated with the scene to the keyword detector 32.

The keyword detector 32 performs morphological analysis on the information (text information) of the subtitles and captions received from the subtitle/character detector 31 in order to detect keywords.

Here, the morphological analysis is one of fundamental technologies for natural language processing using a calculator such as a computer, and is an operation for dividing a sentence written using a natural language into a sequence of morphemes (broadly speaking, a minimum unit having a meaning in language) in order to distinguish parts of speech. In this example, morphological analysis is performed by using the knowledge of grammar of the object language (here, a set of rules of grammar are used) and a dictionary (a list of words having information on parts of speech and the like) as an information source to be referred to.

For example, in the case of information on the subtitles and captions that are displayed on the screen as "(Announcer Tanaka) It is a four-hour ride by car up to the national park", as shown in FIG. 2, in the keyword detector 32, the morphological analysis enables "Tanaka", "announcer", "national park" "four hours", and "ride" to be detected as keywords.

Then, the keyword detector 32 supplies the detected keywords and sets of scene change points formed of the starting points and the ending points of scenes associated with the keywords to the recording processor 4.

Regarding a scene having no associated subtitles and captions, the recording processor 4 records sets of scene change points formed of the starting points and the ending points of scenes from the scene change point detector 10 on the recording medium 5 or the external recording medium 7. Regarding a scene having associated subtitles and captions, the recording processor 4 records sets of scene change points formed of the starting points and the ending points of scenes in such a manner as to correspond to the keywords associated with the scenes on the recording processor 4 or the external recording medium.

The information on the sets of scene change points and the keywords, as described above, are recorded in such a manner as to be contained in an additional information file and in such a manner as to be associated with video and audio information in accordance with recording signal identification information. The recording signal encoding processor 3 records the information on the subtitles and captions together with video and audio data rather than additional information on the recording medium 5 or 7. During reproduction, the recorded subtitles and captions are superimposed on the reproduction image and is displayed in accordance with instructions from the user.

FIG. 3 shows an example of some of data such that sets of scene change points formed of the starting points and the ending points of scenes correspond to associated keywords in an additional information file recorded on the recording medium 5 or the external recording medium 7.

In the example of FIG. 3, each scene (segmentation section) specified by sets of adjacent scene change points indicated by a field number (or a frame number) from the beginning of a recorded broadcast program and keywords associated with the scenes are recorded in such a manner as to correspond to each other.

This embodiment has a normal recording mode in which recording is performed in such a manner that a broadcast program currently being received by the receiver 2 is started to be recorded by operating the record button and the recording is completed by operating a stop button, a scheduled recording function for recording a scheduled program to be recorded on the basis of EPG data obtained by the EPG obtaining section 8, and a user evaluation reflected scheduled recording function for automatically performing scheduled recording of a broadcast program preferred by the user. The user evaluation reflected scheduled recording function will be described later.

Data of correspondence between sets of scene change points formed of the starting points and the ending points of scenes and associated data may not be recorded in such a manner as to be contained in the additional information file, and may be supplied to a multiplexing processor within the recording signal encoding processor 3 so that they are multiplexed with video data and audio data on which a compression encoding process has been performed and are recorded in a predetermined recording area of the recording medium 5 or the external recording medium 7.

Processes performed by the feature amount detector 9 and the scene change point detector 10 may be software processes to be performed by a microcomputer of the system controller 20.

<Reproduction System Process>

Next, a description will be given, with reference to FIG. 1, of the reproduction system of the recording and reproduction apparatus according to this embodiment. The operation of the normal reproduction mode will be described first.

When the user inputs a reproduction instruction in a normal reproduction mode from the recording medium 5 or the external recording medium 7 via, for example, the remote commander 22, the reproduction instruction is input to the system controller 20 via the user input interface section 21. Upon receiving this user input, the system controller 20 controls the reading controller 11 so that a normal reproduction mode is performed.

When the instruction from the system controller 20 is reading from the recording medium 5, the reading controller 11 supplies compressed video data and compressed audio data that are specified to be reproduced from the recording medium 5 to the reproduction processor 12. When the instruction from the system controller 20 is reading from the external recording medium 7, the reading controller 11 accesses the external recording medium 7 via the external recording medium processor 6, reads compressed video data and compressed audio data that are specified to be reproduced from the external recording medium 7, and supplies the data to the reproduction processor 12 via the external recording medium processor 6.

The reproduction processor 12 supplies the compressed video data and the compressed audio data that are specified to be reproduced by the user, which are read from the recording medium 5 or the external recording medium 7, to the reproduction decoding output section 13.

In the reproduction decoding output section 13, the reproduced video data and the reproduced audio data of the broadcast program are separated into video data and audio data. The separated compressed audio data is subjected to a predetermined decoding process corresponding to a signal processing method in which a band compression process has been performed on the data during recording. The digital audio signal obtained by being decoded is subjected to a D/A (Digital to Analog) conversion process, and is thereby output as an analog audio signal via an output terminal 14*a*.

Furthermore, in the reproduction decoding output section 13, the separated compressed audio data is subjected to a predetermined decoding process corresponding to a signal processing method in which a band compression process has been performed on the data during recording, thereby being formed as a digital video signal. Thereafter, a D/A conversion process is performed on the digital video signal, and the signal is output as an analog video signal via an output terminal 14*v*.

The additional information file read by the reading controller 11 from the recording medium 5 is supplied from the reproduction processor 12 to the additional information file processor 15. Then, in the additional information file processor 15, information on the scene change points and information on the keywords associated with each scene are extracted and supplied to the system controller 20.

The user input interface section 21 and the remote commander 22 of the recording and reproduction apparatus according to this embodiment have a fast forward operation button such that the system controller 20 performs control so that a section is reproduced in fast forward mode in response to a fast forward operation button being pressed while reproduction is being performed at a normal reproduction speed in a reproduction mode, a skip reproduction instruction operation button such that, when pressed, the system controller 20 performs control so that skipping or high-speed reproduction is performed to a forward reproduction position by a fixed amount of time, and a rewinding reproduction operation button such that, when pressed, the system controller 20 returns from the current position to a previous reproduction position by a fixed amount of time and reproduces the same portion again.

Furthermore, in addition to the normal reproduction mode, the recording and reproduction apparatus according to this embodiment has, as a reproduction mode, a user evaluation reflected digest reproduction mode in which a reproduction process having a user evaluation (to be described later) reflected is performed. For this purpose, the recording and reproduction apparatus according to this embodiment has a normal reproduction button for specifying a normal reproduction mode and a user evaluation reflected digest reproduction button for specifying a user evaluation reflected digest reproduction mode. Alternatively, when a user evaluation reflected digest reproduction mode is specified, the button for specifying user evaluation reflected digest reproduction may be operated in addition to the normal reproduction button.

In the recording and reproduction apparatus according to this embodiment, when the fast forward reproduction operation button, the skip instruction operation button, or a rewinding reproduction button is operated in a reproduction mode (also including both a normal reproduction mode and a user evaluation reflected digest reproduction mode), a user evaluation value is generated and assigned to the fast forward reproduced section, the skip reproduced section, and the rewound and reproduced section in response to the reproduction button operation. This process is performed by a user evaluation value generator 33. The details of this process will be described further.

When the user operates the fast forward reproduction operation button or the skip reproduction instruction operation button while reproduction is being performed at a normal speed, the user evaluation value generator 33 determines that a reproduction signal section in which such operation has been performed is a section in which user evaluation is in a negative direction, which does not require reproduction for the user, assigns a negative user evaluation value to the section, and temporarily holds the value.

Furthermore, in this embodiment, the user evaluation value generator 33 determines that the section of the reproduction signal corresponding to the reproduction section in which the normal speed reproduction is maintained is a section in which user evaluation is in a positive direction, assigns a positive user evaluation value (including 0) to the section, and temporarily holds the value. Furthermore, when the rewinding reproduction button is operated and the same section is reproduced, the user evaluation value generator 33 assigns a larger positive user evaluation value to the section, and temporarily holds the value.

In practice, during reproduction, information (hereinafter referred to as "section reproduced state information") on the fast forward reproduced section, the skip reproduced section, or the rewound and reproduced section in response to operation of the fast forward reproduction operation button, the skip instruction operation button, or the rewinding reproduction button, respectively, is held. When the reproduction is completed, on the basis of the held information on the section reproduction state, a user evaluation value corresponding to the fast forward reproduced section, the skip reproduced section, or the rewound and reproduced section is generated.

In this embodiment, the information on the section reproduction state of the fast forward reproduced section, the skip reproduced section, or the rewound and reproduced section is reflected in units of scenes (segmentation sections) represented by sets of scene change points, and a user evaluation value to be assigned to each scene is determined.

That is, in this embodiment, information on scene change points of recording information is recorded in the additional information file recorded on the recording medium 5 or 7, and one scene (segmentation section) is specified by a set of two adjacent scene change points.

Therefore, in this embodiment, the additional information file recorded on the recording medium 5 or the external recording medium 7 is obtained via the additional information file processor 15. It is determined whether each of the scenes specified by two adjacent scene change points is contained in a section in a reproduced state (also including a section in a state in which normal reproduction is performed without operating any button) in response to pressing of a reproduction operation button, and a user evaluation value is assigned to each scene.

For example, in the case of a scene within a fast forward reproduced section produced by pressing of the fast forward reproduction operation button or a skip reproduced section produced by pressing of the skip instruction operation button, a negative user evaluation value is assigned to the scene. In the case of a scene for which normal reproduction has been performed or a scene within the rewound and reproduced section produced by pressing the rewinding reproduction button, a positive user evaluation value is assigned to the scene.

In this case, when the button operation starting point and the button operation ending point of the fast forward reproduction button, the skip instruction operation button, or the rewinding reproduction button exactly match the scene change points, the problem of which of a positive or negative evaluation value should be assigned to the signal does not occur. However, when the button operation starting point and the button operation ending point of the fast forward reproduction button, the skip instruction operation button, or the rewinding reproduction button do not match the scene change points, which of a positive or negative user evaluation value should be assigned to the scene containing the operation starting point and the operation ending point becomes a problem.

That is, when the button operation starting point and the button operation ending point of the fast forward reproduction button, the skip instruction operation button, and the rewinding reproduction button do not match the scene change point, there are two kinds of cases in which a corresponding user evaluation value in a negative or positive direction is assigned to the scene containing the operation starting point and in which a corresponding user evaluation value in a negative or positive direction is assigned to the scene containing the operation starting point and a user evaluation value in a negative direction is assigned from the scene starting from the next scene change point. Either of the cases may be used. However, considering the fact that, when the user makes an evaluation, the user operates a button after viewing the scene, it is considered that the user has made an evaluation in a negative direction when the operation is started. Therefore, it is natural that a user evaluation value in a negative direction is assigned to the scene containing the operation starting point.

In a similar manner, when the button operation ending point of the fast forward reproduction button, the skip instruction operation button, or the rewinding reproduction button does not match the scene change point, there are two kinds of cases in which a user evaluation value in a negative direction is assigned to the scene containing the operation ending point and in which a user evaluation value in a positive direction is assigned to the scene containing the operation ending point. Either of the cases may be used. However, also, in this case, considering the fact that, when the user makes an evaluation, the user operates a button after viewing the scene, it is considered that the user has made an evaluation in a positive direction when the operation ends. Therefore, it is natural that a user evaluation value in a positive direction is assigned to the scene containing the operation ending point.

FIG. 4 shows an example of user evaluation values assigned to various reproduction modes of normal reproduction, fast forward reproduction, skip reproduction, and rewinding reproduction. That is, in the example of FIG. 4, the user evaluation value of the scene that is normally reproduced is assigned to "0", the user evaluation value of the scene that is fast forward reproduced is assigned to "−5", the user evaluation value of the skip reproduced scene is assigned to "−10", and the user evaluation value of the scene that is rewound and reproduced is assigned to "+10". The assignment data of FIG. 4 is held in the user evaluation value generator 33.

In the user evaluation value generator 33, after the broadcast program is recorded on the recording medium, the user evaluation value, which is, for example, "0", is assigned to each scene before a first reproduction is performed in this embodiment.

Then, when the reproduction is performed, as described above, the section reproduction mode information on the fast forward reproduced section, the skip reproduced section, the rewound and reproduced section, and the normally reproduced section is held.

When the reproduction is completed, the system controller 20 reads the additional information file recorded on the recording medium 5 or the external recording medium 7, obtains the additional information file via the additional information file processor 15, and transfers it to the user evaluation value generator 33. The user evaluation value generator 33 determines as to which reproduction section among the fast forward reproduced section, the skip reproduced section, the rewound and reproduced section, and the normally reproduced section each of the scenes recorded in the additional information file belongs to on the basis of the held section reproduction state information, and assigns a user evaluation value to each scene.

Instead of reading an additional information file after the reproduction is completed and assigning a user evaluation value to each scene, the additional information file may be read prior to reproduction, and a user evaluation value may be assigned to each scene on the basis of the section reproduction state information while reproduction is being performed.

An example of user evaluation values assigned to scenes (segmentation sections), in which scenes and a group of keywords of the additional information file are as shown in FIG. 3, is shown in FIG. 5. As can be understood from FIG. 5, the user evaluation value assigned to each scene can also be considered as a user evaluation value for the keywords associated with the scene.

Next, the system controller 20 instructs a user evaluation value accumulation and storage section 34 to accumulate the user evaluation value for each of the keywords. Therefore, in the user evaluation value accumulation and storage section 34, not only the user evaluation value for the keywords, which are obtained during the reproduction, but also the user evaluation value for each keyword is accumulated at all the occasions of the reproduction performed in the past, and the accumulated user evaluation value for each keyword is stored.

Each time a keyword that does not exist before appears in the user evaluation value accumulation and storage section 34, the new keyword is added to the user evaluation value accumulation and storage section 34, and the user evaluation value is correspondingly recorded.

As a result, a keyword having a larger user evaluation value in a positive direction from among the keywords recorded in the user evaluation value accumulation and storage section 34 can be considered to be a keyword associated with a scene preferred by the user.

Therefore, in this embodiment, when a process for accumulating and storing the user evaluation value for the keyword in the user evaluation value accumulation and storage section 34 is completed, the system controller 20 sends the information stored in the user evaluation value accumulation and storage section 34 to a keyword ranking generator 35 and also sends a process start instruction.

In this embodiment, the keyword ranking generator 35 performs a process for arranging keywords in descending order of the user evaluation value with a ranking value being attached to each keyword, as shown in FIG. 6. Here, the ranking value of the keyword relates to a ranking of a keyword corresponding to a scene preferred by the user and a program containing a scene preferred by the user.

Therefore, by using a keyword having a high ranking value, it is possible to search for a scene preferred by the user and a program containing the scene, extract it, and reproduce it. The user evaluation reflected digest reproduction mode is a reproduction mode in which only scenes preferred by the user and programs containing the scenes are extracted and reproduced.

Furthermore, for example, it is also possible to search for a program containing a keyword having a high ranking value in program description character information or the like in the EPG data, to schedule it, and record it. The user evaluation reflected scheduled recording mode provided in this embodiment is an example thereof.

The user evaluation value generator 33, the user evaluation value accumulation and storage section 34, and the keyword ranking generator 35 can also be configured as software processes performed by the CPU of the system controller 20 except for a memory section for storing data.

Next, the processing operation during the reproduction mode will be described. The user inputs a command for instructing the starting of one of the reproduction modes by using the remote commander 22 or via the operation button of the recording and reproduction apparatus. Then, the operation information is supplied to the system controller 20 via the user input interface section 21, and under the control of the system controller 20, the recording and reproduction apparatus performs the above-described reproduction process.

In the normal reproduction mode, as described above, information on the normal speed reproduced section, the fast forward reproduced section, the skip reproduced section, and the rewound and reproduced section is held.

Then, after the reproduction is completed, as described above, an additional information file for the reproduced program is obtained, and a user evaluation value generation process for each scene, a user evaluation value storage process for each keyword, a process for assigning the ranking of a keyword on the basis of a user evaluation value, and the like are performed.

The user evaluation value generation process for each scene may also be performed in parallel during the reproduction. In such a case, prior to the reproduction, an additional information file is obtained via the additional information file processor 15.

Then, in the normal reproduction mode, in a section that is normal speed reproduced while reproduction is being performed, a scene contained in the section is searched for from the additional information file obtained from the additional information file processor 15, "0" is assigned to the user evaluation value of the scene, and the user evaluation value is held in such a manner as to correspond to the information on a pair of adjacent scene change points for specifying the scene.

When the above-described fast forward reproduction operation is performed by the user, the system controller 20 detects the operation input via the user input interface section 21, searches the additional information file obtained from the additional information file processor 15 for a scene contained in the section that is instructed so as to be fast forward reproduced, assigns "−5" as the user evaluation value of the scene, and holds the user evaluation value in such a manner as to correspond to the information on a pair of adjacent scene change points for specifying the scene.

When the user performs the above-described skip reproduction operation, the system controller 20 detects the operation input via the user input interface section 21, searches the additional information file obtained from the additional information file processor 15 for a scene contained in the section that is instructed to be skip reproduced, assigns "−10" as the user evaluation value of the scene, and holds the user evaluation value in such a manner as to correspond to the information on a pair of adjacent scene change points for specifying the scene.

When the user performs the above-described rewinding reproduction operation, the system controller 20 detects the operation input via the user input interface section 21, searches the additional information file obtained from the additional information file processor 15 for a scene contained in the section that is instructed to be rewound and reproduced, assigns "+10" as the user evaluation value of the scene, and holds the user evaluation value in such a manner as to correspond to the information on a pair of adjacent scene change points for specifying the scene.

When operation of the normal reproduction mode is instructed by the user, in a case in which the additional information file has not been recorded in such a manner as to correspond to the data of a broadcast program recorded on the recording medium 5 or the external recording medium 7, the recording and reproduction apparatus according to this embodiment makes an inquiry to the user as to "Currently, there is no necessary additional information file, should the file be generated?".

When the user responds with a reply of "YES (generate the additional information file)" in response to this inquiry, prior to performing the reproduction mode, the system controller 20 of the recording and reproduction apparatus reads the recording data of the recorded broadcast program, supplies it to the feature amount detector 9 via the reproduction processor 12 and the reproduction decoding output section 13, and performs control so that the feature amounts are detected and the scene change points are detected by the scene change point detector 10. Then, the additional information file shown in FIG. 3, which contains information on the detected scene change points and keywords associated with each scene, is recorded on the recording medium 5 or the external recording medium 7 in such a manner as to correspond to the recording data of the broadcast program to be reproduced.

As a result, for example, even if the external recording medium 7 is not recorded upon by the recording and reproduction apparatus according to this embodiment and the additional information file is not recorded, reflection can be made in the user evaluation value of each of the keywords, which serves as a reference for performing reproduction in the user evaluation reflected digest reproduction mode and the user evaluation reflected scheduled recording mode in the recording and reproduction apparatus according to this embodiment. The same applies to the recording data of the broadcast program that is copied from the external recording medium 7 on which the additional information file has not been recorded and is recorded on the recording medium 5.

<User Evaluation Reflected Digest Reproduction Mode>

In the user evaluation reflected digest reproduction mode, the system controller 20 obtains the keyword having a high ranking value from among the keywords generated by the keyword ranking generator 35 and also prefetches and obtains information on the sets of scene change points of the additional information file and information on the associated keywords.

Then, by using the obtained keyword having a high ranking value as a search element, a search is made for the keyword obtained from the additional information file, and a set of scene change points containing the same keyword, that is, a scene (segmentation section), is detected. Then, only the detected scene is extracted, and only the scene is reproduced (digest reproduced).

That is, in this embodiment, by using a keyword having a high ranking value as a search element, a search is made for the keyword obtained from the additional information file, and a set of scene change points containing the same keyword, that is, a scene (segmentation section), is recommended and reproduced for the user.

At this time, for the keyword used as a search element, only the keyword having the highest ranking value may be used, or the user may specify setting as to the range of ranking values of keywords to use as search elements.

Also, in the user evaluation reflected digest reproduction mode, when the extracted scene is fast forward reproduced, is skip reproduced, or is rewound and reproduced, a corresponding user evaluation value is assigned to the scene, and the assigned user evaluation value is accumulated and stored as the accumulated user evaluation value in association with the keyword in the user evaluation value accumulation and storage section 34.

When the user evaluation reflected digest reproduction mode is specified by the user, an additional information file is not recorded in the data of the broadcast program recorded on the recording medium 5 or the external recording medium 7 in such a manner as to correspond to it, the recording and reproduction apparatus reproduction issues a message to the user that "Currently, there is no necessary additional information file, so use of the user evaluation reflected reproduction mode is not possible" in order to inform the user of the situation.

<User Evaluation Reflected Scheduled Recording Mode>

When the user evaluation reflected scheduled recording mode is set, the system controller 20 obtains a keyword having a high ranking value from among the keywords generated by the keyword ranking generator 35 and also obtains EPG data from the EPG obtaining section 8.

Then, by using the obtained keyword having a high ranking value as a search element, a search is made of description character text of each broadcast program of the EPG data, and any broadcast program whose description character text contains the same keyword is detected. Then, scheduled recording setting of the detected broadcast program is performed on the basis of the EPG data so that scheduled recording will be performed.

That is, in this embodiment, by using the keyword having a high ranking value as a search element, a search is made of description character text of each broadcast program of the EPG data, and a broadcast program containing the same keyword is detected, and the detected broadcast program is recommended as a program scheduled to be recorded for the user.

<Description of Main Operation Processes in Recording and Reproduction Apparatus According to this Embodiment>

Next, a description will be given, with reference to the flowcharts in FIGS. 7 to 13, of main operation processes in the recording and reproduction apparatus that is configured as described above according to this embodiment. The process of each step in the flowcharts described in the following is mainly performed by the microcomputer constituting the system controller 20.

Figure 7:
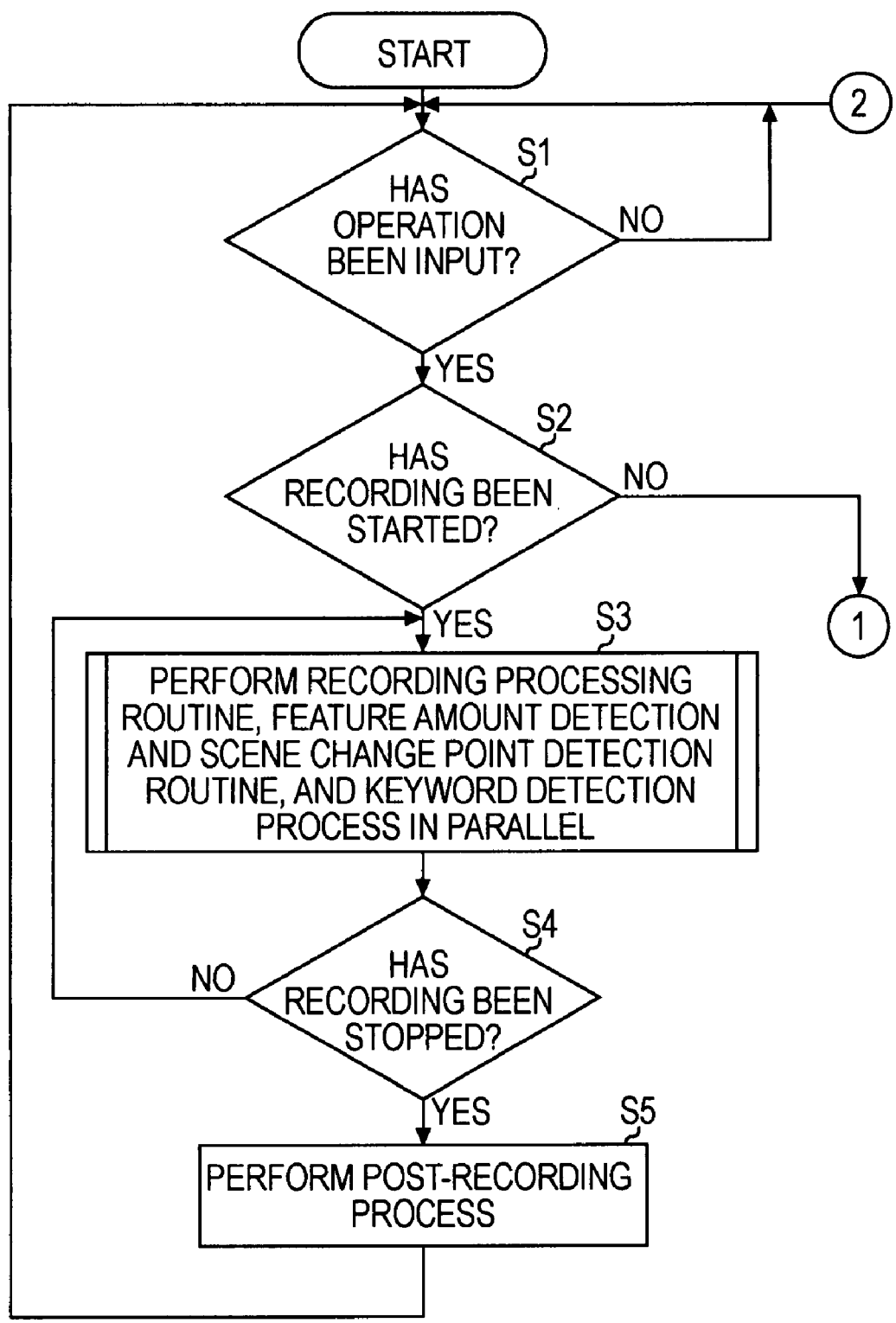
FIG. 7 shows a part of a flowchart illustrating recording and reproduction processing operation in the recording and reproduction apparatus according to the embodiment of the present invention.

That is, as shown in FIG. 7, the system controller 20 monitors whether or not a user operation input has occurred by monitoring the output of the user input interface section 21 (step S1). When it is determined that a user operation input has occurred, the system controller 20 determines whether or not the user operation input is a recording starting operation (step S2). When it is determined that the user operation input is a recording starting operation, a recording processing routine, a feature amount detection and scene change point detection routine, a process for detecting information on subtitles and captions using a closed caption, and a keyword detection process are performed in parallel (step S3).

Then, the system controller 20 monitors whether or not the user has performed an operation for stopping the recording (step S4). When the user's operation for stopping the recording is not detected, the process returns to step S3, where the parallel execution of the recording processing routine and the feature amount detection and scene change point detection routine is continued. When the user's operation for stopping the recording is determined to have been performed, a post-recording process is performed (step S5), and thereafter the process returns to step S1.

In the post-recording process of step S5, the system controller 20 records an additional information file on a recording medium in such a manner as to correspond to the recording data of the recorded broadcast program, the additional information file containing data such that data of scene change points (sets of scene change points) detected by the scene change point detector 10 and the keywords detected by the keyword detector 32 are associated with each other. In this case, making the additional information file correspond to the recording data of the recorded broadcast program is performed in accordance with the identification information of the recorded broadcast program.

As a result of the detection of the scene change point, which is performed in real time concurrently with the recording process, rather than recording the scene change point itself in such a manner as to be contained in the additional information file, in the post-recording process, a more accurate scene change point may be detected by the scene change point detector 10 by further adding considerations to the detection result of the scene change point detection performed concurrently with the recording process, and the scene change point may be recorded in such a manner that the more accurate scene change point is contained in the additional information file.

Figure 8:
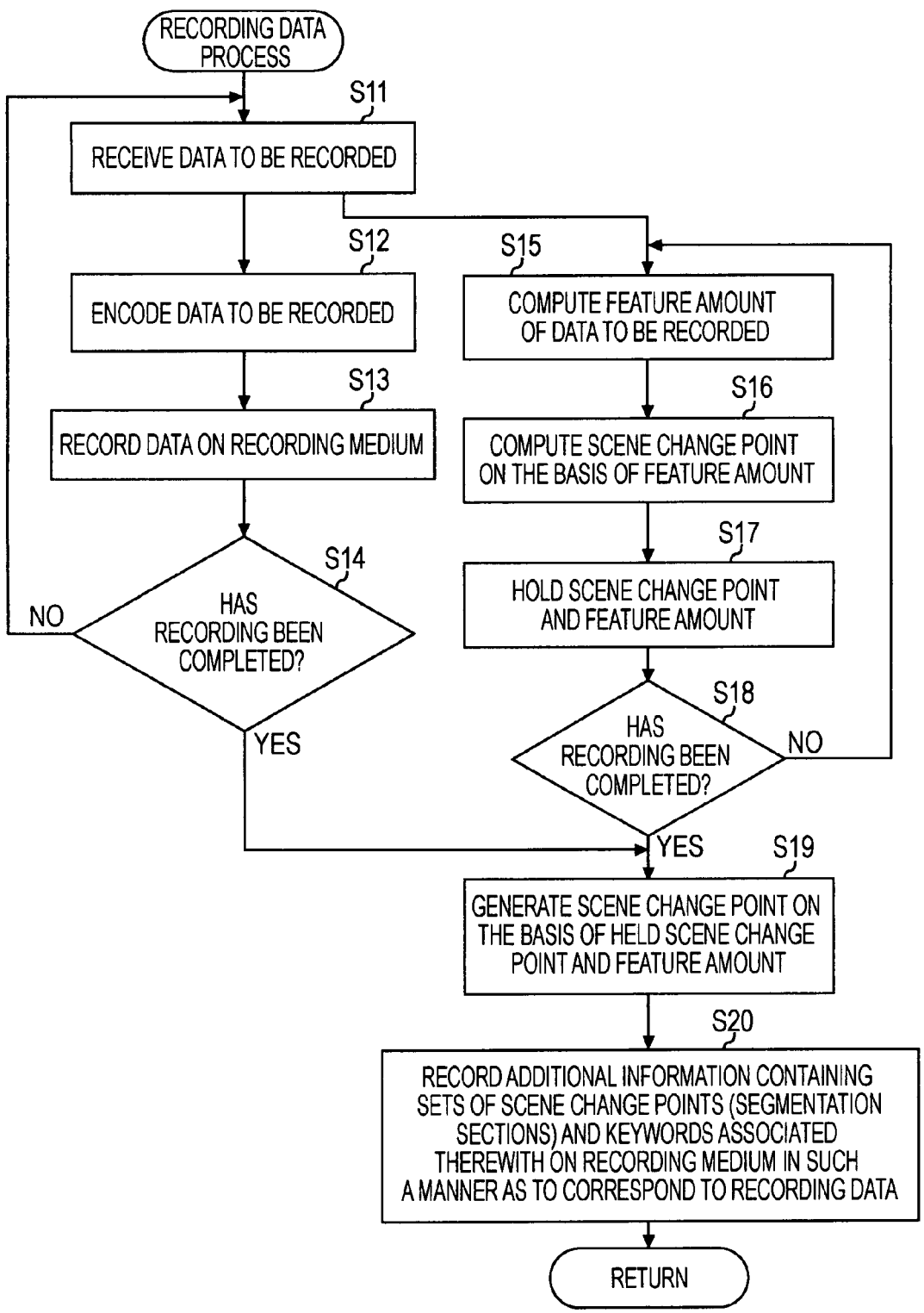
FIG. 8 is a flowchart illustrating a recording processing operation in the recording and reproduction apparatus according to the embodiment of the present invention.

The parallel processing routine of the recording process and the feature amount detection and scene change point detection process, which is performed in step S3, will be described with reference to the flowchart in FIG. 8.

Initially, the system controller 20 receives data to be recorded (step S11). That is, when the data to be recorded is information on the broadcast program (video and audio information) from the receiver 2, the system controller 20 instructs that the information on the broadcast program that is selectively received by the receiver 2 be supplied to the recording signal encoding processor 3.

Next, the system controller 20 instructs the recording signal encoding processor 3 to perform a recording encoding process on the information of the broadcast program (step S12) and controls the recording processor 4 so as to record the video information and the audio information of the encoded broadcast program on one of the recording medium 5 and the external recording medium 7 that is selectively specified by the user (step S13).

Then, the system controller 20 determines whether or not the completion of the recording has been instructed by the user (step S14). When it is determined that the completion of the recording has not been instructed, the process returns to step S11, where the recording process is continued.

Steps S11 to S14 constitute the recording processing routine, and the feature amount detection and scene change point detection processing routine is performed in parallel with the recording processing routine. That is, the system controller 20 instructs that data to be recorded, which is received in step S11, be also supplied to the feature amount detector 9 and also instructs the feature amount detector 9 to perform a feature amount detection process (step S15). As described above, in this example, the data in the middle of being compressed from the recording signal encoding processor 3 is supplied to the feature amount detector 9.

Upon receiving the execution instruction, the feature amount detector 9 performs detection of the above-described various kinds of feature amounts and supplies the processing result to the scene change point detector 10. Upon receiving the execution instruction from the system controller 20, the scene change point detector 10 performs the above-described scene change point detection process (step S16). Then, the system controller 20 stores and holds the feature amount data detected by the feature amount detector 9 and the data of the scene change points detected by the scene change point detector 10 in an incorporated buffer memory or the like (step S17). Here, the reason why the feature amount data detected by the feature amount detector 9 is also stored and held is that data is used when a more accurate scene change point is generated again.

Then, the system controller 20 determines whether or not the completion of the recording has been instructed by the user (step S18). When it is determined that the completion of the recording has not been instructed, the process returns to step S15, where the processes for detecting the feature amount and the scene change point are continued.

In practice, the determination process of step S14 and the determination process of step S18 are not different determination processes, but the same. However, here, since two processing routines are described in parallel, for the sake of convenience, they are separated into two determination steps and described, as shown in FIG. 8.

Then, when it is determined in steps S14 or S18 that the completion of the recording has been instructed by the user, the system controller 20 instructs the scene change point detector 10 to generate more accurate information on a scene change point, which is recorded together with the recording data of the broadcast program on the recording medium 5 or the external recording medium 7, by using the feature amount data and the scene change point data held in the buffer memory (step S19).

Then, the system controller 20 controls the recording processor 4 so that, as shown in FIG. 3, an additional information file containing information on the scene change points generated in step S19 and keywords associated with each scene specified by two adjacent scene change points is recorded in such a manner as to correspond to the recording data on a recording medium on which the recording data of the broadcast program is recorded (step S20). The process for detecting the keyword associated with the scene specified by a pair of scene change points is performed separately by the keyword detector 32.

Figure 9:
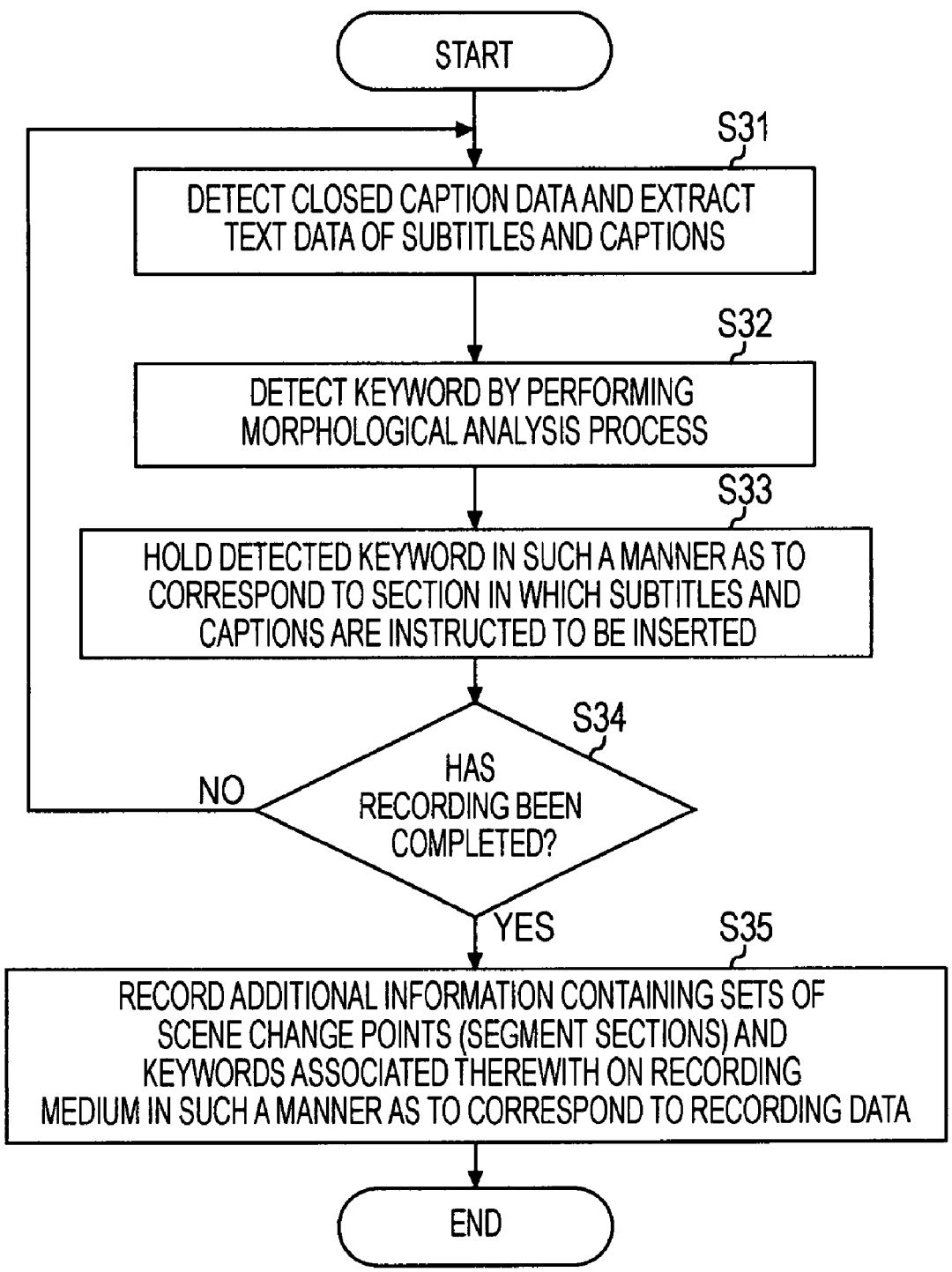
FIG. 9 is a flowchart illustrating keyword detection processing operation in the recording and reproduction apparatus according to the embodiment of the present invention.

The keyword detection process will be described with reference to the flowchart in FIG. 9.

Initially, under the control instruction of the system controller 20, the subtitle/character detector 31 detects closed caption data and extracts text data of the subtitles and captions (step S31).

The subtitle/character detector 31 supplies the extracted text data of the subtitles and captions to the keyword detector 32. The keyword detector 32 performs the above-described morphological analysis process on the obtained text data of the subtitles and captions in order to detect a keyword (step S32).

Then, the detected keyword is held in such a manner as to correspond to the information on the section in which the subtitles and captions that are information specified from the broadcasting side is instructed to be inserted (step S33). Since the keyword detector 32 obtains information on the scene change point from the scene change point detector 10 via the subtitle/character detector 31, the insertion-instructed section is converted into a scene section formed of a pair of scene change points.

Next, the system controller 20 determines whether or not the user has performed a recording completion process (step S34). When it is determined that the user has not performed a recording completion process, the process returns to step S31, where the above-described keyword detection process is repeated.

When it is determined in step S34 that the recording has been completed, the keyword detector 32 obtains information on the scene change points generated by the scene change point detector 10 in step S19 and performs a process for associating pairs of obtained scene change points with keywords. The information on the pairs of scene change points and the keywords associated therewith is recorded on the recording medium, as described above, in step S20 (step S35).

Figure 10:
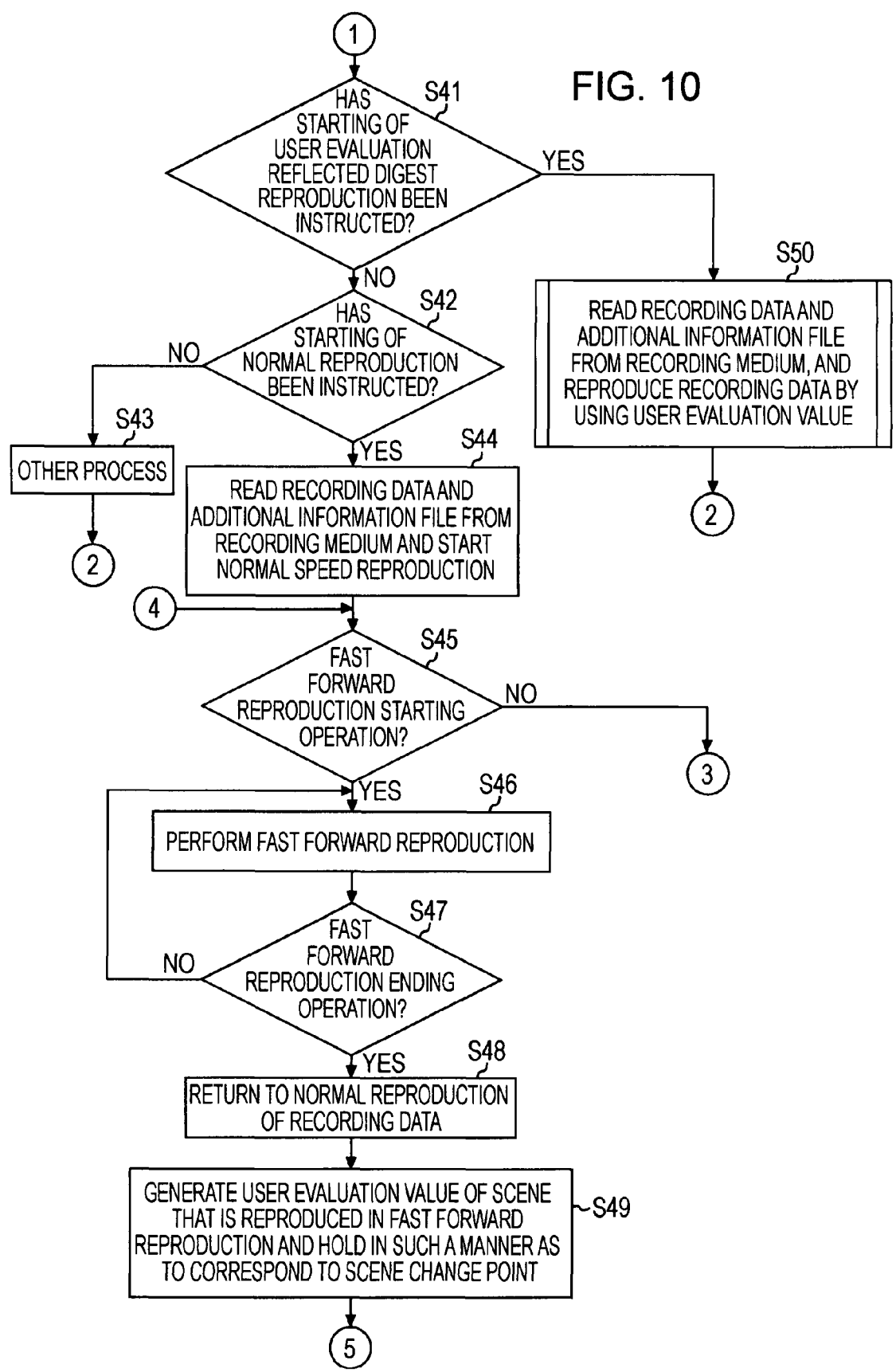
FIG. 10 shows a part of a flowchart illustrating recording and reproduction processing operation in the recording and reproduction apparatus according to the embodiment of the present invention.

Next, when it is determined in step S2 of FIG. 7 that the operation input is not a recording starting operation, the system controller 20 determines whether or not the operation input is a user evaluation reflected digest reproduction starting instruction operation (step S41 of FIG. 10). When it is determined in step S41 that the operation input is not a user evaluation reflected digest reproduction starting instruction operation, the system controller 20 determines whether or not the operation input is a normal reproduction starting instruction operation (step S42). When it is determined that the operation input is not a normal reproduction starting instruction operation, the system controller 20 performs another process corresponding to the operation input (step S43). Then, after the process, the process returns to step S1, and processing of step S1 and subsequent steps is repeated.

When it is determined in step S42 that the operation input is a normal reproduction starting instruction operation, the system controller 20 reads the recording data of the specified broadcast program and the additional information file (including information on the scene change points and information on the keywords associated with each scene) from the recording medium 5 or 7 to be reproduced, which is specified by the operation input, and starts a normal speed reproduction (step S44).

While the reproduction is being performed at the normal speed, the system controller 20 monitors whether or not a fast forward reproduction starting operation has been performed (step S45). When it is determined that the fast forward reproduction starting operation has been performed, the system controller 20 controls the reading controller 11, the reproduction processor 12, the reproduction decoding output section 13, and the like so as to perform fast forward reproduction from that point on (step S46). Next, the system controller 20 monitors a fast forward reproduction ending operation (step S47) and continues the execution of the fast forward reproduction of step S46 until it is determined that the fast forward reproduction ending operation has been performed.

When it is determined in step S47 that the fast forward reproduction ending operation has been performed, the system controller 20 controls the reading controller 11, the reproduction processor 12, the reproduction decoding output section 13, and the like so as to return the reproduction to a normal speed reproduction from that point on (step S48).

In this example, the system controller 20 obtains information on the scene change points of the fast forward reproduced scene and information on the keywords from the additional information file read from the recording medium, passes the information to the user evaluation value generator 33, and instructs the user evaluation value generator 33 to perform a process for generating a user evaluation value for each of the fast forward reproduced scenes and holding it (step S49).

The user evaluation value generator 33 receiving this instruction, as, for example, in the above-described example of FIG. 2, a user evaluation value for a fast forward reproduced scene is generated and held in, for example, an incorporated buffer memory in such a manner as to correspond to the scene change points of the fast forward reproduced scene.

Figure 11:
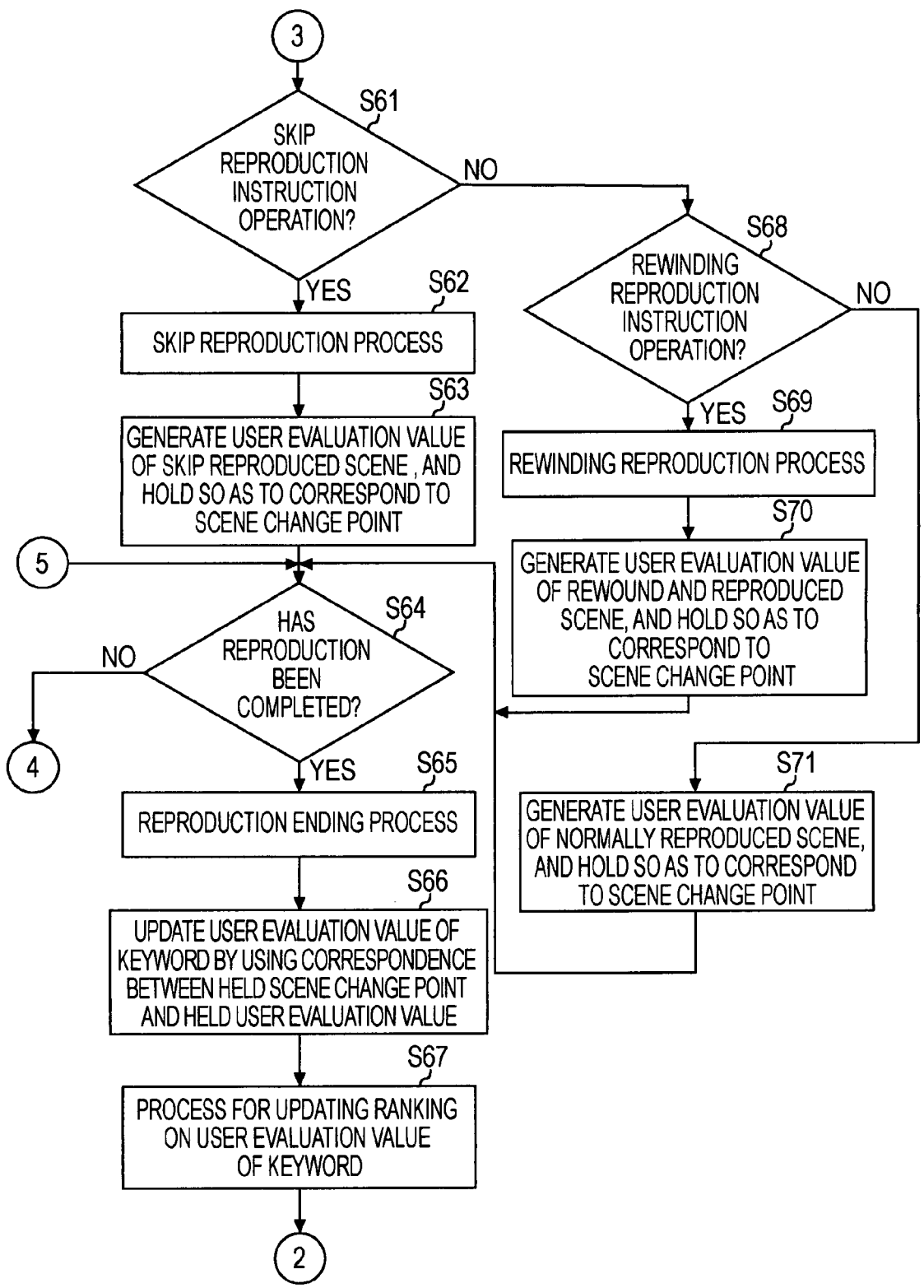
FIG. 11 shows a part of a flowchart illustrating recording and reproduction processing operation in the recording and reproduction apparatus according to the embodiment of the present invention.

Thereafter, the system controller 20 determines whether or not the reproduction completion instruction operation has been performed as user operation input (step S64 in FIG. 11). When it is determined that the reproduction completion instruction operation has not been performed, the process returns to step S45 of FIG. 10.

When it is determined in step S45 of FIG. 10 that the fast forward reproduction starting operation has not been performed, the system controller 20 determines whether or not a skip reproduction instruction operation has been performed (step S61 in FIG. 11).

When it is determined in step S61 that the skip reproduction instruction operation has been performed, the system controller 20 skips from the instructed reproduction position to a reproduction position a predetermined time period later, for example, 15 seconds later, and performs normal speed reproduction (step S62).

Then, the system controller 20 obtains information on the scene change points of the skip reproduced scene and information on the keywords from the additional information file read from the recording medium, passes the information to the user evaluation value generator 33, and instructs the user evaluation value generator 33 to perform a process for generating a user evaluation value for each of the skip reproduced scenes and holding it (step S63).

In the user evaluation value generator 33 receiving this instruction, as, for example, in the above-described example of FIG. 2, a user evaluation value for a skip reproduced scene is generated and held in, for example, an incorporated buffer memory in such a manner as to correspond to the scene change points of the skip reproduced scene.

Thereafter, the system controller 20 determines whether or not the reproduction completion instruction operation has been performed as user operation input (step S64). When it is determined that the reproduction completion instruction operation has not been performed, the process returns to step S45 of FIG. 10.

When it is determined in step S61 that the skip reproduction instruction operation has also not been performed, the system controller 20 determines whether or not a rewinding reproduction instruction operation has been performed by the user (step S68).

When it is determined in step S68 that the rewinding reproduction instruction operation has been performed, the system controller 20 rewinds from the instructed reproduction position to a reproduction position a predetermined time period before, for example, a reproduction position 15 seconds before, and performs normal speed reproduction of the same section again (step S69).

Then, the system controller 20 obtains information on the scene change points of the rewound and reproduced scene and information on the keywords from the additional information file read from the recording medium, passes the information to the user evaluation value generator 33, and instructs the user evaluation value generator 33 to perform a process for generating the user evaluation value for each of the rewound and reproduced scenes and holding it (step S70).

In the user evaluation value generator 33 receiving this instruction, as, for example, in the above-described example of FIG. 2, a user evaluation value for a rewound and reproduced scene is generated and held in, for example, an incorporated buffer memory in such a manner as to correspond to the scene change points of the rewound and reproduced scene.

When it is determined in step S68 that the rewinding reproduction instruction operation has not been performed, by determining that the section has been reproduced at a normal speed, the system controller 20 obtains information on the scene change points of the normally reproduced scene and information on the keyword from the additional information file read from the recording medium, passes the information to the user evaluation value generator 33, and instructs the user evaluation value generator 33 to perform a process for generating the user evaluation value for each of the normally reproduced scenes and holding it (step S71).

In the user evaluation value generator 33 receiving this instruction, as, for example, a user evaluation value for a normally reproduced scene is generated and held in, for example, an incorporated buffer memory in such a manner as to correspond to the scene change points of the normally reproduced scene.

In this example, since the user evaluation value is set to "0" for the normal reproduction, step S71 is not provided. When it is determined in step S68 that the rewinding reproduction instruction operation has not been performed, the process may jump from step S68 to step S71.

After step S70 or step S71, the system controller 20 determines whether or not a reproduction completion instruction operation has been performed as user operation input (step S64). When it is determined that the reproduction completion instruction operation has not been performed, the process returns to step S45 of FIG. 10.

When it is determined in step S64 that the reproduction completion instruction operation has been performed, the system controller 20 performs a process for ending the reproduction (step S65), thereafter updates the user evaluation value for the keyword of each scene by using pairs (scene) of scene change points of the scene reproduced in each reproduction mode, and generated updated user evaluation values, which are held in the buffer memory in steps S49, S63, S70, and S71, and supplies the updated user evaluation value of the keyword to the keyword ranking generator 35 (step S66).

The keyword ranking generator 35 performs a ranking updating process on the user evaluation value by using the data on the obtained updated user evaluation value of the keyword (step S67).

Then, the process returns to step S1 of FIG. 7, and processing of step S1 and subsequent steps is repeated.

As described above, according to this embodiment, each time reproduction is performed, a user evaluation value is assigned to each scene of the information on the recorded broadcast program, and is accumulated and stored as the user evaluation value of the keyword associated with the scene.

<Processing Operation in User Evaluation Reflected Digest Reproduction Mode>

When it is determined in step S41 of FIG. 10 that the user evaluation reflected digest reproduction starting instruction has been performed, the system controller 20 reads the recording data of the broadcast program and the additional information file from the recording medium 5 or 7, and performs a user evaluation reflected digest reproduction process for performing reproduction control on the basis of data of the keyword associated with each scene of the additional information file and the keywords having a high ranking value among the keywords generated by the keyword ranking generator 35 (step S50).

Figure 12:
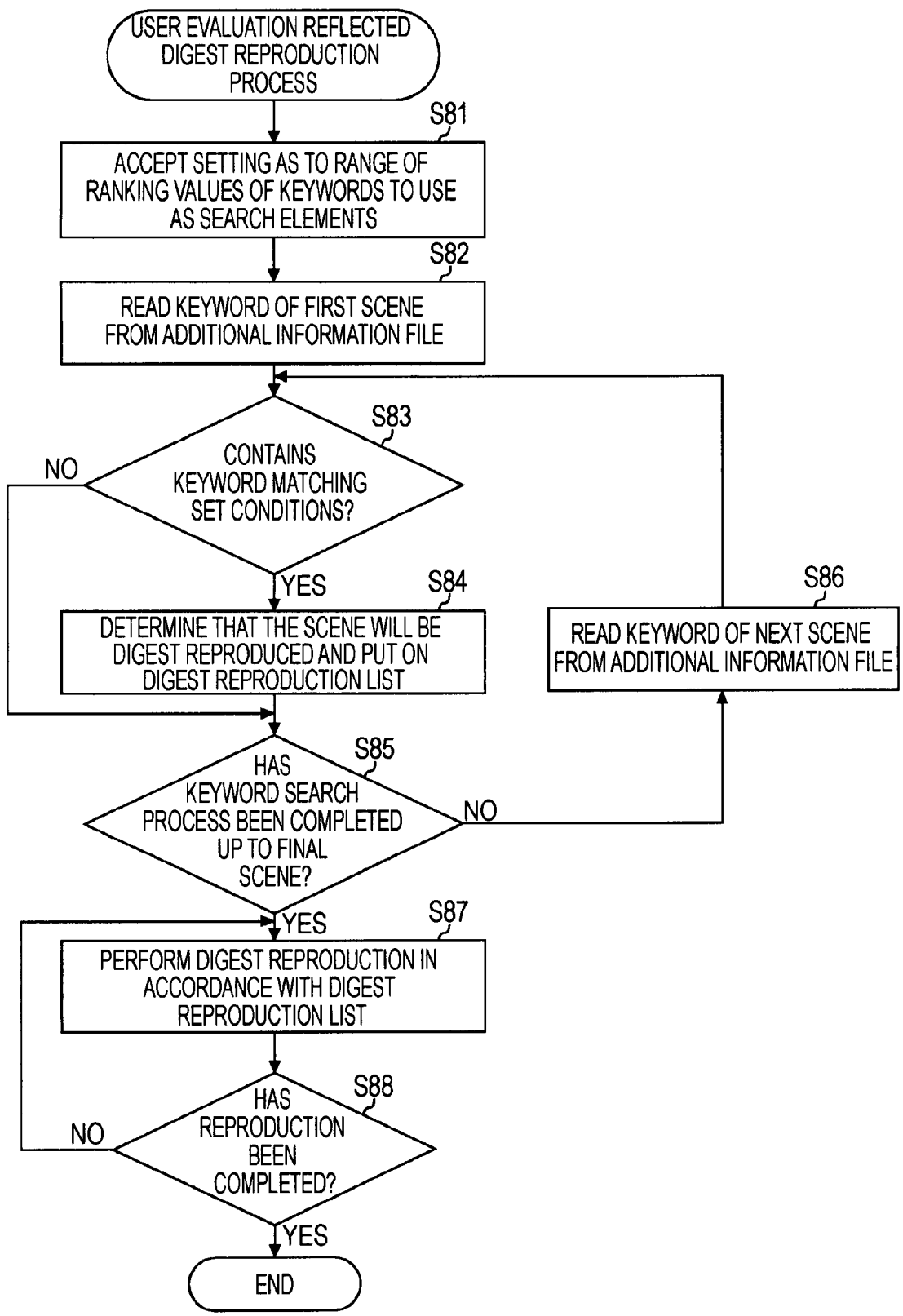
FIG. 12 is a flowchart illustrating a new reproduction processing operation using a user evaluation value of a keyword in the recording and reproduction apparatus according to the embodiment of the present invention.

FIG. 12 shows a flowchart of an example of a user evaluation reflected digest reproduction process. In the user evaluation reflected digest reproduction process, the system controller 20 prefetches information on the scene change points of the additional information file and the user evaluation value for each scene from the recording medium, and controls the reading controller 11, the reproduction processor 12, and the reproduction decoding output section 13 so that reproduction corresponding to the prefetched user evaluation value is performed.

That is, first, on the display section 24, the system controller 20 displays a message inquiring of the user as to the range of ranking values of keywords as search elements, at which digest reproduction should be performed, and accepts setting of search elements as to the range of ranking values of keywords to use, the setting being input from the user in response to the inquiry display (step S81).

Next, the system controller 20 reads the additional information file corresponding to the recording data of the broadcast program to be reproduced from the recording medium 5 or 7 and temporarily holds it in the additional information file processor 15. Then, the system controller 20 reads the keywords at the section of the first scene change point and the keywords of the scene corresponding to the section (step S82).

Then, in this example, the system controller 20 determines whether or not the prefetched keywords contain the keyword of the search element (step S83). When it is determined that the prefetched keywords contain the keyword of the search element, the system controller 20 places the scene in the digest reproduction list by determining that the scene should be extracted and reproduced (digest reproduced) (step S84).

Then, it is determined whether or not the above-described keyword search process has been completed up to the final scene of the additional information file (step S85). When it is determined that the keyword search process has not been completed up to the final scene, the keywords of the next scene are read from the additional information file (step S86), and the process returns to step S83, where the above-described keyword search process is repeated.

When it is determined in step S83 that the prefetched keywords do not contain the keyword of the search element, the system controller 20 proceeds to step S85 without performing a process for placing the scene in the digest reproduction list by determining that the scene should not be digest reproduced and repeats processing of step S85 and subsequent steps.

When it is determined in step S85 that the keyword search process has been completed up to the final scene, the system controller 20 reads only the recording data of the scene placed in the list from the recording medium 5 or 7 in accordance with the digest reproduction list and performs next digest reproduction (step S87).

Then, it is determined whether or not the digest reproduction has been completed (step S88). When it is determined that the digest reproduction has not been completed, the process returns to step S87, where the digest reproduction is repeated. When the digest reproduction is determined to have been completed, this processing routine is completed.

As described above, in this embodiment, by assigning a user evaluation value to reproduction viewing with respect to a section (scene) in which user operation, such as fast forward reproduction instruction operation or skip reproduction instruction operation during reproduction when a recorded broadcast program is reproduced and viewed, the user evaluation value is recorded in such a manner as to correspond to each scene (segmentation section) of the information of the recorded broadcast program.

Then, with respect to the keyword recorded in association with each scene, the user evaluation value assigned to the scene is accumulated and stored. Therefore, the keyword having a high user evaluation value is a keyword associated with the scene preferred by the user. By performing digest reproduction using this keyword, it is possible for the user to reproduce and view only the scenes preferred by the user.

In this embodiment, the scene change point is detected and is recorded in the additional information file. In correspondence with this additional information file, a thumbnail image of the frame at the scene change point is generated and provided to the user, so that the content of the scene specified by adjacent scene change points can be notified to the user.

Therefore, it is possible for the user to confirm the content of the scene placed in the digest reproduction list in the user evaluation reflected digest reproduction mode while viewing the thumbnail image. Then, the user is able to make the confirmation result of the content reflected in the digest reproduction list and to delete a scene not necessitating viewing.

Since the scene deletion instruction in the digest reproduction mode is a user operation, the user evaluation value of the keyword may be updated by assigning a negative user evaluation value to the keyword associated with the deleted scene.

<User Evaluation Reflected Scheduled Recording Mode>

Figure 13:
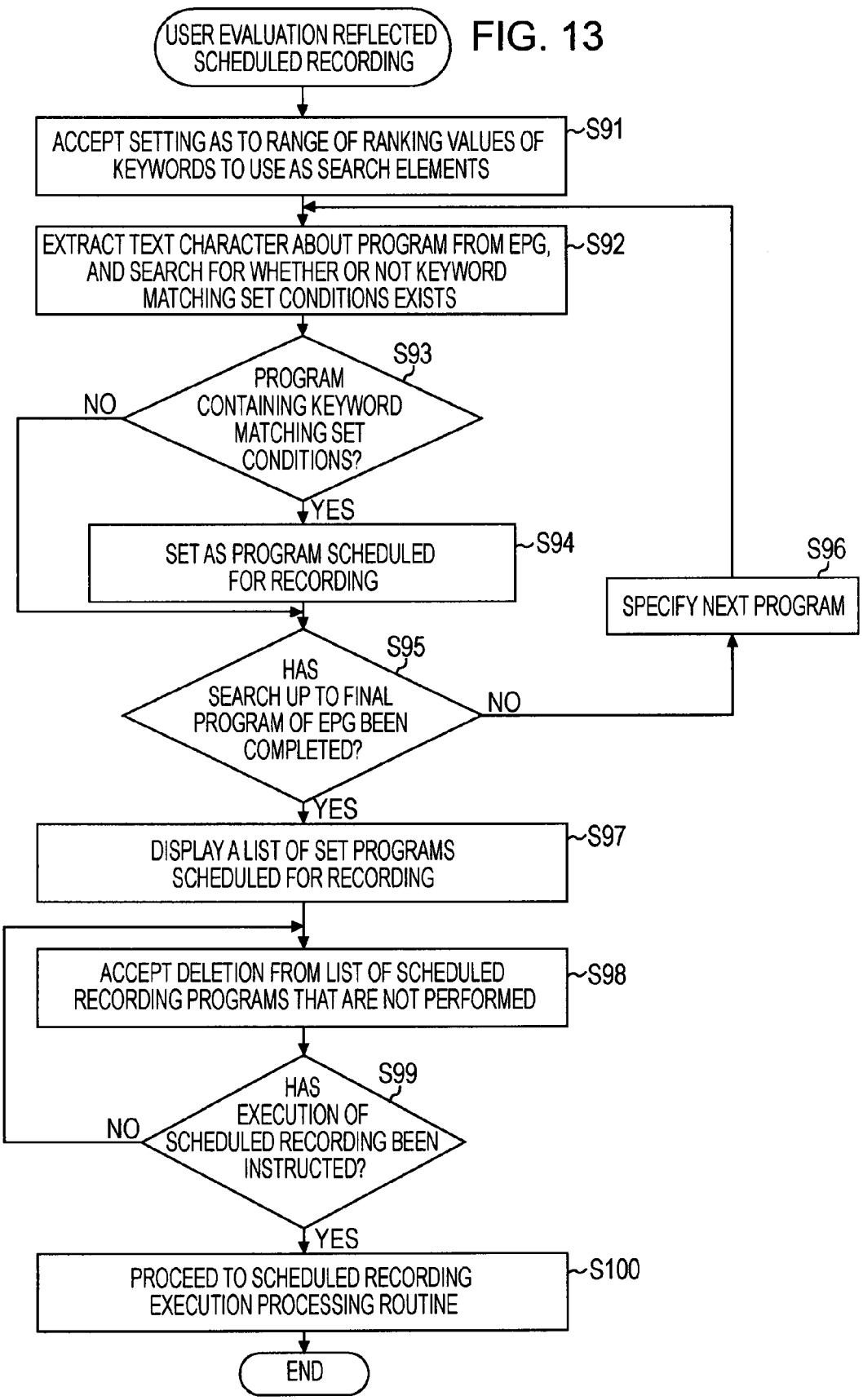
FIG. 13 is a flowchart illustrating a new scheduled recording processing operation using a user evaluation value of a keyword in the recording and reproduction apparatus according to the embodiment of the present invention.

Next, a description will be given, with reference to the flowchart in FIG. 13, of the processing in a user evaluation reflected scheduled recording mode using a user evaluation value of a keyword.

Initially, the system controller 20 displays a message on the display section 24, which inquires of the user as to the range of ranking values of keywords as search elements, at which reflected scheduled recording should be performed, and accepts setting of search elements as to the range of ranking values of keywords to use, the setting being input from the user in response to the inquiry display (step S91).

Next, the system controller 20 obtains the EPG data of the broadcast program from the EPG obtaining section 8, searches for description character text of each broadcast program of the EPG data by using the keyword having a high ranking value, which is accepted in step S91 as a search element (step S92), and determines whether or not the broadcast program contains the same keyword as the keyword of the search element (step S93).

Then, when the broadcast program to be searched for is determined to contain the same keyword as the keyword of the search element, the system controller 20 sets the broadcast program as a broadcast program to be scheduled for recording (step S94).

Then, it is determined whether or not the above-described keyword search process has been completed up to the final broadcast program of the EPG (step S95). When it is determined that the keyword search process has not been completed up to the final broadcast program, the next broadcast program of the EPG data is specified (step S96). The process then returns to step S92, and the keyword search process is repeated.

When it is determined in step S93 that the broadcast program to be searched for does not contain the same keyword as the keyword of the search element, the system controller 20 does not perform a process for setting scheduled recording by determining that the broadcast program is not scheduled to be recorded. The process then proceeds to step S95, and processing of step S95 and subsequent steps is repeated.

When it is determined in step S95 that the keyword search process has been completed up to the final broadcast program, the system controller 20 displays a list of set scheduled recording programs on the display section 24 so as to be displayed for the user (step S97), accepts an instruction of deletion from the list of scheduled recording programs that will not be performed, and shows the set of the scheduled recording programs that are instructed to be deleted (step S98).

Next, it is determined whether or not a scheduled recording execution instruction from the user has been accepted (step S99). When it is determined that the scheduled recording execution instruction has not been accepted, the process returns to step S98. When it is determined that the scheduled recording execution instruction has been accepted, the system controller 20 performs a scheduled recording execution processing routine (step S100), and the processing routine then ends. As a result, all the scheduled recordings of the set scheduled recording programs are performed.

As described in the foregoing, according to this embodiment, it is possible to automatically schedule recording of a broadcast program containing a scene preferred by the user.

[Modifications of Embodiments and Other Embodiments]

In the above-described embodiments, a keyword associated with a scene is detected from text information of subtitles and captions using a closed caption. Alternatively, subtitles and captions superimposed on an image using an open caption may be detected from image information, text information may be extracted from the information of the detected subtitles and captions, and a keyword may be detected.

Furthermore, character recognition may be performed on the audio signal of each scene so that it is converted into text information, and a keyword may be detected from the converted text information.

In the above-described embodiments, no distinction is made for a user who performs operation in the recording and reproduction apparatus. Alternatively, for example, prior to reproduction, user identification information may be input so that a user evaluation value for the keyword is accumulated and stored for each user, making it possible to perform digest reproduction and scheduled recording in accordance with a preference for each user.

In the above-described embodiments, the user evaluation value of a keyword is accumulated and stored for the reproduction of all the recorded broadcast program information regardless of the type such as genre. Alternatively, a user evaluation value accumulation and storage section and a keyword ranking generator may be provided for each type such as, for example, genre of a recorded broadcast program so that the user evaluation value of the keyword is accumulated and stored for each genre.

In this case, in the case of the user evaluation reflected digest reproduction mode and the user evaluation reflected scheduled recording mode, for example, genre is specified, and the user evaluation value and the ranking of the keyword in the user evaluation value accumulation and storage section and the keyword ranking generator for each genre are used and also, user evaluation reflected digest reproduction and user evaluation reflected scheduled recording can be performed. In this case, in the user evaluation reflected scheduled recording mode, first, the broadcast program of the specified genre is selected from the EPG data, and it is determined whether or not the text character of the description as the EPG data for the selected broadcast program contains the keyword set as a search element.

The type by which the broadcast program is classified is not limited to genre, and a method for selecting, for example, a broadcast program in which a specific artist appears from EPG data may be used.

In the above-described embodiments, the recommendation means recommends a scene or a program for the purpose of digest reproduction or scheduled recording. The provision of a scene and a broadcast program, which is performed by the recommendation means, is not limited to the cases of digest reproduction and scheduled recording.

For example, during reproduction, scenes containing keywords in the range of ranking values, which are set as search elements, may be normally reproduced, and the other scenes may be fast forward reproduced. Furthermore, the thumbnail of a scene containing a keyword having a high ranking value may be provided to the user, and if the user selects the provided thumbnail, the scene corresponding to the thumbnail may be reproduced.

[Other Modifications, etc.]

The present invention can be applied to a case in which, in addition to being a receiver of a terrestrial digital television broadcast, the receiver 2 of the above-described embodiments is a receiver of a terrestrial analog television broadcast, a receiver of a satellite digital television broadcast, a receiver of a cable television broadcast, or a receiver of a television broadcast distributed over the Internet.

The above-described embodiments describe a case in which the present invention is applied to recording and reproduction of a television broadcasting program. However, the present invention is not limited to recording and reproduction of a television broadcasting program. In addition, the present invention can be applied to, for example, recording and reproduction of a radio broadcasting program and also to recording and reproduction of various information signals.

The scene section divided by scene change points can be detected on the basis of the feature amounts of both video information and audio information as in the above-described embodiments and also, can be detected on the basis of the feature amount of only video information or only audio information.

It should be understood by those skilled in the art that various modifications, combinations, sub-combinations and alterations may occur depending on design requirements and other factors insofar as they are within the scope of the appended claims or the equivalents thereof.

The invention claimed is:

1. A recording and reproduction apparatus comprising:
information signal recording means for recording an information signal on a recording medium;
reproduction means for reading and reproducing the information signal recorded on the recording medium;
feature amount detection means for detecting feature amounts of the information signal to be recorded and/or the reproduced information signal;
division detection means for detecting divisions of the information signal by using the feature amounts detected by the feature amount detection means;
keyword obtaining means for obtaining a keyword for each of a plurality of segmentation sections of the signal information, the keyword being associated with the segmentation section and each of the segmentation sections being specified by two adjacent divisions detected by the division detection means;
keyword recording means for recording, for each segmentation section, the keywords obtained by the keyword obtaining means on the recording medium in such a manner as to correspond to each of the segmentation sections of the information signal;
user operation input detection means for detecting operation input by a user;
user evaluation value generation means for generating a user evaluation value on the basis of the operation input so as to correspond to each of the segmentation sections in such a manner that the operation input by the user is monitored by monitoring detection output of the user operation input detection means and, when the detection output indicates a predetermined reproduction operation that does not request that the information signal be normally reproduced as the operation input by the user while the information signal is being normally reproduced, a user evaluation value in a negative direction is assigned to the operation input;
keyword evaluation value accumulation and storage means for accumulating the user evaluation value for each of the keywords and storing the accumulated evaluation value for each of the keywords in such a way that the user evaluation value for each of the segmentation sections, generated by the user evaluation value generation means, is associated with the evaluation value of the keyword of the segmentation section; and
recommendation means for referring to the evaluation values of the keywords stored in the keyword evaluation value accumulation and storage means in order to detect the information signal or the segmentation section having a keyword having a large evaluation value as the keyword of the segmentation section from within the information signals or the segmentation sections recorded on the recording medium, and for recommending the information signal or the segmentation section to the user.

2. A recording and reproduction apparatus comprising:
information signal recording means for receiving an information signal transmitted via a communication network and recording the information signal on a recording medium;
reproduction means for reading and reproducing the information signal recorded on the recording medium;
feature amount detection means for detecting feature amounts of the information signal to be recorded and/or the reproduced information signal;
division detection means for detecting divisions of the information signal by using the feature amounts detected by the feature amount detection means;
keyword obtaining means for obtaining a keyword for each of a plurality of segmentation sections of the signal information, the keyword being associated with the segmentation section and each of the segmentation sections being specified by two adjacent divisions detected by the division detection means;
keyword recording means for recording, for each segmentation section, the keywords obtained by the keyword obtaining means on the recording medium in such a manner as to correspond to each of the segmentation sections of the information signal;
user operation input detection means for detecting operation input by a user;

user evaluation value generation means for generating a user evaluation value on the basis of the operation input so as to correspond to each of the segmentation sections in such a manner that the operation input by the user is monitored by monitoring detection output of the user operation input detection means and, when the detection output indicates a predetermined reproduction operation that does not request that the information signal be normally reproduced as the operation input by the user while the information signal is being normally reproduced, a user evaluation value in a negative direction is assigned to the operation input;

keyword evaluation value accumulation and storage means for accumulating the user evaluation value for each of the keywords and storing the accumulated evaluation value for each of the keywords in such a way that the user evaluation value for each of the segmentation sections, generated by the user evaluation value generation means, is associated with the evaluation value of the keyword of the segmentation section;

scheduling information obtaining means for receiving transmission scheduling information containing information in the form of character information related to the information signal transmitted via the communication network; and recommendation means for detecting an information signal scheduled to be transmitted, the information signal containing a keyword having a large evaluation value among the evaluation values of the keywords stored in the keyword evaluation value accumulation and storage means, within the character information contained in the transmission scheduling information obtained by the scheduling information obtaining means, and for recommending the information signal to the user.

3. A recording and reproduction apparatus comprising:

information signal recording means for recording an information signal on a recording medium;

reproduction means for reading and reproducing the information signal recorded on the recording medium;

feature amount detection means for detecting feature amounts of the information signal to be recorded and/or the reproduced information signal;

division detection means for detecting divisions of the information signal by using the feature amounts detected by the feature amount detection means;

keyword obtaining means for obtaining a keyword for each of a plurality of segmentation sections of the signal information, the keyword being associated with the segmentation section and each of the segmentation sections being specified by two adjacent divisions detected by the division detection means;

keyword recording means for recording, for each segmentation section, the keywords obtained by the keyword obtaining means on the recording medium in such a manner as to correspond to each of the segmentation sections of the information signal;

user operation input detection means for detecting operation input by a user;

user evaluation value generation means for generating a user evaluation value on the basis of the operation input so as to correspond to each of the segmentation sections in such a manner that the operation input by the user is monitored by monitoring detection output of the user operation input detection means and, when the detection output indicates a predetermined reproduction operation that does not request that the information signal be normally reproduced as the operation input by the user while the information signal is being normally reproduced, a user evaluation value in a negative direction is assigned to the operation input;

keyword evaluation value accumulation and storage means for accumulating the user evaluation value for each of the keywords and storing the accumulated evaluation value for each of the keywords in such a way that the user evaluation value for each of the segmentation sections, generated by the user evaluation value generation means, is associated with the evaluation value of the keyword of the segmentation section; and reproduction control means for controlling a reproduction mode for the segmentation section or a reproduction mode of the information signal containing the segmentation section on the basis of the keyword for each of the segmentation sections recorded on the recording medium and the evaluation value of the keyword stored in the keyword evaluation value accumulation and storage means.

4. The recording and reproduction apparatus according to claim 2, further comprising means for automatically recording the information signal scheduled to be transmitted, the information signal being recommended by the recommendation means.

5. The recording and reproduction apparatus according to claim 1, further comprising ranking means for assigning a ranking value in proportion to a user evaluation value to the keyword on the basis of the user evaluation value for each of the keywords stored in the keyword evaluation value accumulation and storage means, wherein the recommendation means detects an information signal or a segmentation section having the same keyword as the keyword having a high ranking value assigned by the ranking means as the keyword of the segmentation section from within the information signals or the segmentation sections recorded on the recording medium, and recommends the information signal or the segmentation section to the user.

6. The recording and reproduction apparatus according to claim 2, further comprising ranking means for assigning an ordinal rank in proportion to the user evaluation value to the keyword on the basis of the user evaluation value for each of the keywords stored in the keyword evaluation value accumulation and storage means, wherein the recommendation means detects the information signal scheduled to be transmitted such that the same keyword as the keyword having a high ranking value assigned by the ranking means is contained in the character information contained in the transmission scheduling information, and recommends the information signal to the user.

7. The recording and reproduction apparatus according to claim 3, further comprising ranking means for assigning an ordinal rank in proportion to the user evaluation value to the keyword on the basis of the user evaluation value for each of the keywords stored in the keyword evaluation value accumulation and storage means, wherein the reproduction control means performs control so that the segmentation section or an information signal containing the segmentation section with which the same keyword as the keyword having a high ranking value assigned by the ranking means are associated among the keywords whose evaluation values are stored in the keyword evaluation value accumulation and storage means.

8. A recording and reproduction method comprising the steps of:

recording an information signal on a recording medium;
reading and reproducing the information signal recorded on the recording medium;
detecting feature amounts of the information signal to be recorded and/or the reproduced information signal;
storing the feature amount detected in the feature amount detection;
detecting divisions of the information signal by using the feature amounts detected in the feature amount detection;
obtaining a keyword for each of a plurality of segmentation sections of the signal information, the keyword being associated with the segmentation section and each of the segmentation sections being specified by two adjacent divisions detected in the division detection;
recording, for each segmentation section, the keywords obtained in the keyword obtainment on the recording medium in such a manner as to correspond to each of the segmentation sections of the information signal;
detecting operation input by a user;
generating a user evaluation value on the basis of the operation input so as to correspond to each of the segmentation sections in such a manner that the operation input by the user is monitored by monitoring detection output of the user operation input detection and, when the detection output indicates a predetermined reproduction operation that does not request that the information signal be normally reproduced as the operation input by the user while the information signal is being normally reproduced, a user evaluation value in a negative direction is assigned to the operation input;
accumulating the user evaluation value for each of the keywords and storing the accumulated evaluation value for each of the keywords in such a way that the user evaluation value for each of the segmentation sections, generated in the user evaluation value generation, is associated with the evaluation value of the keyword of the segmentation section; and
referring to the evaluation values of the keywords stored in the keyword evaluation value accumulation and storage in order to detect the information signal or the segmentation section having a keyword having a large evaluation value as the keyword of the segmentation section from within the information signals or the segmentation sections recorded on the recording medium, and recommending the information signal or the segmentation section to the user,
wherein the reading and reproducing the information signal is by a processor.

9. A recording and reproduction method comprising the steps of:
recording an information signal on a recording medium;
reading and reproducing the information signal recorded on the recording medium;
detecting feature amounts of the information signal to be recorded and/or the reproduced information signal;
storing the feature amount detected in the feature amount detection;
detecting divisions of the information signal by using the feature amounts detected in the feature amount detection;
obtaining a keyword for each of a plurality of segmentation sections of the signal information, the keyword being associated with the segmentation section and each of the segmentation sections being specified by two adjacent divisions detected in the division detection;
recording, for each segmentation section, the keywords obtained in the keyword obtainment on the recording medium in such a manner as to correspond to each of the segmentation sections of the information signal;
detecting operation input by a user;
generating a user evaluation value on the basis of the operation input so as to correspond to each of the segmentation sections in such a manner that the operation input by the user is monitored by monitoring detection output of the user operation input detection and, when the detection output indicates a predetermined reproduction operation that does not request that the information signal be normally reproduced as the operation input by the user while the information signal is being normally reproduced, a user evaluation value in a negative direction is assigned to the operation input;
accumulating the user evaluation value for each of the keywords and storing the accumulated evaluation value for each of the keywords in such a way that the user evaluation value for each of the segmentation sections, generated in the user evaluation value generation, is associated with the evaluation value of the keyword of the segmentation section;
receiving transmission scheduling information containing information in the form of character information related to the information signal transmitted via the communication network; and
detecting an information signal scheduled to be transmitted, the information signal containing a keyword having a large evaluation value among the evaluation values of the keywords stored in the keyword evaluation value accumulation and storage, within the character information contained in the transmission scheduling information obtained in the scheduling information obtainment, and recommending the information signal to the user,
wherein the reading and reproducing the information signal is by a processor.

10. A recording and reproduction method comprising the steps of:
recording an information signal on a recording medium;
reading and reproducing the information signal recorded on the recording medium;
detecting feature amounts of the information signal to be recorded and/or the reproduced information signal;
storing the feature amount detected in the feature amount detection;
detecting divisions of the information signal by using the feature amounts detected in the feature amount detection;
obtaining a keyword for each of a plurality of segmentation sections of the signal information, the keyword being associated with the segmentation section and each of the segmentation sections being specified by two adjacent divisions detected in the division detection;
recording, for each segmentation section, the keywords obtained in the keyword obtainment on the recording medium in such a manner as to correspond to each of the segmentation sections of the information signal;
detecting operation input by a user;
generating a user evaluation value on the basis of the operation input so as to correspond to each of the segmentation sections in such a manner that the operation input by the user is monitored by monitoring detection output of the user operation input detection and, when the detection output indicates a predetermined reproduction operation that does not request that the information signal be normally reproduced as the operation input by the user while the information signal is being normally reproduced, a user evaluation value in a negative direction is assigned to the operation input;

accumulating the user evaluation value for each of the keywords and storing the accumulated evaluation value for each of the keywords in such a way that the user evaluation value for each of the segmentation sections, generated in the user evaluation value generation, is associated with the evaluation value of the keyword of the segmentation section; and controlling a reproduction mode for the segmentation section or a reproduction mode of the information signal containing the segmentation section on the basis of the keyword for each of the segmentation sections recorded on the recording medium and the evaluation value of the keyword stored in the keyword evaluation value accumulation and storage, wherein the reading and reproducing the information signal is by a processor.

11. A reproduction apparatus comprising:

reproduction means for reading and reproducing an information signal from a recording medium on which the information signal is recorded and a keyword associated with a segmentation section is recorded, for each of the segmentation sections specified by two adjacent divisions detected using the feature amounts of the information signal, in such a manner as to be associated with the information signal and the segmentation section;

user operation input detection means for detecting operation input by a user;

user evaluation value generation means for generating a user evaluation value on the basis of the operation input so as to correspond to each of the segmentation sections in such a manner that the operation input by the user is monitored by monitoring detection output of the user operation input detection means and, when the detection output indicates a predetermined reproduction operation that does not request that the information signal be normally reproduced as the operation input by the user while the information signal is being normally reproduced, a user evaluation value in a negative direction is assigned to the operation input;

keyword evaluation value accumulation and storage means for accumulating the user evaluation value for each of the keywords and storing the accumulated evaluation value for each of the keywords in such a way that the user evaluation value for each of the segmentation sections, generated by the user evaluation value generation means, is associated with the evaluation value of the keyword of the segmentation section; and recommendation means for referring to the evaluation value of the keyword, stored in the keyword evaluation value accumulation and storage means, in order to detect an information signal or a segmentation section having a keyword having a large evaluation value as the keyword of the segmentation section from within the information signals or the segmentation sections recorded on the recording medium, and for recommending the information signal or the segmentation section to the user.

12. A reproduction apparatus comprising:

reproduction means for reading and reproducing an information signal from a recording medium on which the information signal is recorded and a keyword associated with a segmentation section is recorded, for each of the segmentation sections specified by two adjacent divisions detected using the feature amounts of the information signal, in such a manner as to be associated with the information signal and the segmentation section;

user operation input detection means for detecting operation input by a user;

user evaluation value generation means for generating a user evaluation value on the basis of the operation input so as to correspond to each of the segmentation sections in such a manner that the operation input by the user is monitored by monitoring detection output of the user operation input detection means and, when the detection output indicates a predetermined reproduction operation that does not request that the information signal be normally reproduced as the operation input by the user while the information signal is being normally reproduced, a user evaluation value in a negative direction is assigned to the operation input;

keyword evaluation value accumulation and storage means for accumulating the user evaluation value for each of the keywords and storing the accumulated evaluation value for each of the keywords in such a way that the user evaluation value for each of the segmentation sections, generated by the user evaluation value generation means, is associated with the evaluation value of the keyword of the segmentation section;

scheduling information obtaining means for receiving transmission scheduling information containing information in the form of character information related to the information signal transmitted via the communication network; and recommendation means for detecting an information signal scheduled to be transmitted, the information signal containing a keyword having a large evaluation value among the evaluation values of the keywords stored in the keyword evaluation value accumulation and storage means, within the character information contained in the transmission scheduling information obtained by the scheduling information obtaining means, and for recommending the information signal to the user.

13. A reproduction apparatus comprising:

reproduction means for reading and reproducing an information signal from a recording medium on which the information signal is recorded and a keyword associated with a segmentation section is recorded, for each of the segmentation sections specified by two adjacent divisions detected using the feature amounts of the information signal, in such a manner as to be associated with the information signal and the segmentation section;

user operation input detection means for detecting operation input by a user;

user evaluation value generation means for generating a user evaluation value on the basis of the operation input so as to correspond to each of the segmentation sections in such a manner that the operation input by the user is monitored by monitoring detection output of the user operation input detection means and, when the detection output indicates a predetermined reproduction operation that does not request that the information signal be normally reproduced as the operation input by the user while the information signal is being normally reproduced, a user evaluation value in a negative direction is assigned to the operation input;

keyword evaluation value accumulation and storage means for accumulating the user evaluation value for each of the keywords and storing the accumulated evaluation value for each of the keywords in such a way that the user evaluation value for each of the segmentation sections, generated by the user evaluation value generation means, is associated with the evaluation value of the keyword of the segmentation section; and reproduction control means for controlling a reproduction mode for the segmentation section or a reproduction mode of the information signal containing the segmentation section on the basis of the keyword for each of the segmentation sections recorded on the recording medium and the evaluation value of the keyword stored in the keyword evaluation value accumulation and storage means.

14. A reproduction method comprising the steps of:

reading an information signal from a recording medium on which the information signal is recorded, divisions of the information signal are detected using the feature amounts of the information signal, a keyword associated with a segmentation section is recorded, for each of the segmentation sections specified by two adjacent divisions, in such a manner that the keyword associated with the segmentation section is associated with the information signal and the segmentation section, and reproducing the information signal;

detecting operation input by a user;

generating a user evaluation value on the basis of the operation input so as to correspond to each of the segmentation sections in such a manner that the operation input by the user is monitored by monitoring detection output of the user operation input detection and, when the detection output indicates a predetermined reproduction operation that does not request that the information signal be normally reproduced as the operation input by the user while the information signal is being normally reproduced, a user evaluation value in a negative direction is assigned to the operation input;

accumulating the user evaluation value for each of the keywords and storing the accumulated evaluation value for each of the keywords in such a way that the user evaluation value for each of the segmentation sections, generated in the user evaluation value generation, is associated with the evaluation value of the keyword of the segmentation section; and referring to the evaluation value of the keyword, stored in the keyword evaluation value accumulation and storage, in order to detect an information signal or a segmentation section having a keyword having a large evaluation value as the keyword of the segmentation section from within the information signals or the segmentation sections recorded on the recording medium, and recommending the information signal or the segmentation section to the user, wherein the reading the information signal from the recording medium is by a processor.

15. A reproduction method comprising the steps of:

reading an information signal from a recording medium on which the information signal is recorded, divisions of the information signal are detected using the feature amounts of the information signal, a keyword associated with a segmentation section is recorded, for each of the segmentation sections specified by two adjacent divisions, in such a manner that the keyword associated with the segmentation section is associated with the information signal and the segmentation section, and reproducing the information signal;

detecting operation input by a user;

generating a user evaluation value on the basis of the operation input so as to correspond to each of the segmentation sections in such a manner that the operation input by the user is monitored by monitoring detection output of the user operation input detection and, when the detection output indicates a predetermined reproduction operation that does not request that the information signal be normally reproduced as the operation input by the user while the information signal is being normally reproduced, a user evaluation value in a negative direction is assigned to the operation input;

accumulating the user evaluation value for each of the keywords and storing the accumulated evaluation value for each of the keywords in such a way that the user evaluation value for each of the segmentation sections, generated in the user evaluation value generation, is associated with the evaluation value of the keyword of the segmentation section;

receiving transmission scheduling information containing information in the form of character information related to the information signal transmitted via the communication network; and detecting an information signal scheduled to be transmitted, the information signal containing a keyword having a large evaluation value among the evaluation values of the keywords stored in the keyword evaluation value accumulation and storage, within the character information contained in the transmission scheduling information obtained in the scheduling information obtaining, and recommending the information signal to the user, wherein the reading the information signal from the recording medium is by a processor.

16. A reproduction method comprising the steps of:

reading an information signal from a recording medium on which the information signal is recorded, divisions of the information signal are detected using the feature amounts of the information signal, a keyword associated with a segmentation section is recorded, for each of the segmentation sections specified by two adjacent divisions, in such a manner that the keyword associated with the segmentation section is associated with the information signal and the segmentation section, and reproducing the information signal;

detecting operation input by a user;

generating a user evaluation value on the basis of the operation input so as to correspond to each of the segmentation sections in such a manner that the operation input by the user is monitored by monitoring detection output of the user operation input detection and, when the detection output indicates a predetermined reproduction operation that does not request that the information signal be normally reproduced as the operation input by the user while the information signal is being normally reproduced, a user evaluation value in a negative direction is assigned to the operation input;

accumulating the user evaluation value for each of the keywords and storing the accumulated evaluation value for each of the keywords in such a way that the user evaluation value for each of the segmentation sections, generated in the user evaluation value generation, is associated with the evaluation value of the keyword of the segmentation section, and; and controlling a reproduction mode for the segmentation section or a reproduction mode of the information signal containing the segmentation section on the basis of the keyword for each of the segmentation sections recorded on the recording medium and the evaluation value of the keyword stored in the keyword evaluation value accumulation and storage, wherein the reading the information signal from the recording medium is by a processor.

17. A recording and reproduction apparatus comprising:
an information signal recording section configured to record an information signal on a recording medium;
a reproduction section configured to read and reproduce the information signal recorded on the recording medium;
a feature amount detection section configured to detect feature amounts of the information signal to be recorded and/or the reproduced information signal;
a division detection section configured to detect divisions of the information signal by using the feature amounts detected by the feature amount detection section;
a keyword obtaining section configured to obtain a keyword for each of a plurality of segmentation sections of the signal information, the keyword being associated with the segmentation section and each of the segmentation sections being specified by two adjacent divisions detected by the division detection section;
a keyword recording section configured to record, for each segmentation section, the keywords obtained by the keyword obtaining section on the recording medium in such a manner as to correspond to each of the segmentation sections of the information signal;
a user operation input detection section configured to detect operation input by a user;
a user evaluation value generator configured to generate a user evaluation value on the basis of the operation input so as to correspond to each of the segmentation sections in such a manner that the operation input by the user is monitored by monitoring detection output of the user operation input detection section and, when the detection output indicates a predetermined reproduction operation that does not request that the information signal be normally reproduced as the operation input by the user while the information signal is being normally reproduced, a user evaluation value in a negative direction is assigned to the operation input;
a keyword evaluation value accumulation and storage section configured to accumulate the user evaluation value for each of the keywords and store the accumulated evaluation value for each of the keywords in such a way that the user evaluation value for each of the segmentation sections, generated by the user evaluation value generator, is associated with the evaluation value of the keyword of the segmentation section; and
a recommendation section configured to refer to the evaluation values of the keywords stored in the keyword evaluation value accumulation and storage section in order to detect the information signal or the segmentation section having a keyword having a large evaluation value as the keyword of the segmentation section from within the information signals or the segmentation sections recorded on the recording medium, and configured to recommend the information signal or the segmentation section to the user.

18. A recording and reproduction apparatus comprising:
an information signal recording section configured to receive an information signal transmitted via a communication network and configured to record the information signal on a recording medium;
a reproduction section configured to read and reproduce the information signal recorded on the recording medium;
a feature amount detection section configured to detect feature amounts of the information signal to be recorded and/or the reproduced information signal;
a division detection section configured to detect divisions of the information signal by using the feature amounts detected by the feature amount detection section;
a keyword obtaining section configured to obtain a keyword for each of a plurality of segmentation sections of the signal information, the keyword being associated with the segmentation section and each of the segmentation sections being specified by two adjacent divisions detected by the division detection section;
a keyword recording section configured to record, for each segmentation section, the keywords obtained by the keyword obtaining section on the recording medium in such a manner as to correspond to each of the segmentation sections of the information signal;
a user operation input detection section configured to detect operation input by a user;
a user evaluation value generator configured to generate a user evaluation value on the basis of the operation input so as to correspond to each of the segmentation sections in such a manner that the operation input by the user is monitored by monitoring detection output of the user operation input detection section and, when the detection output indicates a predetermined reproduction operation that does not request that the information signal be normally reproduced as the operation input by the user while the information signal is being normally reproduced, a user evaluation value in a negative direction is assigned to the operation input;
a keyword evaluation value accumulation and storage section configured to accumulate the user evaluation value for each of the keywords and store the accumulated evaluation value for each of the keywords in such a way that the user evaluation value for each of the segmentation sections, generated by the user evaluation value generator, is associated with the evaluation value of the keyword of the segmentation section;
a scheduling information obtaining section configured to receive transmission scheduling information containing information in the form of character information related to the information signal transmitted via the communication network; and
a recommendation section configured to detect an information signal scheduled to be transmitted, the information signal containing a keyword having a large evaluation value among the evaluation values of the keywords stored in the keyword evaluation value accumulation and storage section, within the character information contained in the transmission scheduling information obtained by the scheduling information obtaining section, and configured to recommend the information signal to the user.

19. A recording and reproduction apparatus comprising:
an information signal recording section configured to record an information signal on a recording medium;
a reproduction section configured to read and reproduce the information signal recorded on the recording medium;
a feature amount detection section configured to detect feature amounts of the information signal to be recorded and/or the reproduced information signal;
a division detection section configured to detect divisions of the information signal by using the feature amounts detected by the feature amount detection section;
a keyword obtaining section configured to obtain a keyword for each of a plurality of segmentation sections of the signal information, the keyword being associated with the segmentation section and each of the segmentation sections being specified by two adjacent divisions detected by the division detection section;

a keyword recording section configured to record, for each segmentation section, the keywords obtained by the keyword obtaining section on the recording medium in such a manner as to correspond to each of the segmentation sections of the information signal;

a user operation input detection section configured to detect operation input by a user;

a user evaluation value generator configured to generate a user evaluation value on the basis of the operation input so as to correspond to each of the segmentation sections in such a manner that the operation input by the user is monitored by monitoring detection output of the user operation input detection section and, when the detection output indicates a predetermined reproduction operation that does not request that the information signal be normally reproduced as the operation input by the user while the information signal is being normally reproduced, a user evaluation value in a negative direction is assigned to the operation input;

a keyword evaluation value accumulation and storage section configured to accumulate the user evaluation value for each of the keywords and store the accumulated evaluation value for each of the keywords in such a way that the user evaluation value for each of the segmentation sections, generated by the user evaluation value generator, is associated with the evaluation value of the keyword of the segmentation section; and a reproduction control section configured to control a reproduction mode for the segmentation section or a reproduction mode of the information signal containing the segmentation section on the basis of the keyword for each of the segmentation sections recorded on the recording medium and the evaluation value of the keyword stored in the keyword evaluation value accumulation and storage section.

20. A reproduction apparatus comprising:

a reproduction section configured to read and reproduce an information signal from a recording medium on which the information signal is recorded and a keyword associated with a segmentation section is recorded, for each of the segmentation sections specified by two adjacent divisions detected using the feature amounts of the information signal, in such a manner as to be associated with the information signal and the segmentation section;

a user operation input detection section configured to detect operation input by a user;

a user evaluation value generator configured to generate a user evaluation value on the basis of the operation input so as to correspond to each of the segmentation sections in such a manner that the operation input by the user is monitored by monitoring detection output of the user operation input detection section and, when the detection output indicates a predetermined reproduction operation that does not request that the information signal be normally reproduced as the operation input by the user while the information signal is being normally reproduced, a user evaluation value in a negative direction is assigned to the operation input;

a keyword evaluation value accumulation and storage section configured to accumulate the user evaluation value for each of the keywords and store the accumulated evaluation value for each of the keywords in such a way that the user evaluation value for each of the segmentation sections, generated by the user evaluation value generator, is associated with the evaluation value of the keyword of the segmentation section; and a recommendation section configured to refer to the evaluation value of the keyword, stored in the keyword evaluation value accumulation and storage section, in order to detect an information signal or a segmentation section having a keyword having a large evaluation value as the keyword of the segmentation section from within the information signals or the segmentation sections recorded on the recording medium, and configured to recommend the information signal or the segmentation section to the user.

21. A reproduction apparatus comprising:

a reproduction section configured to read and reproduce an information signal from a recording medium on which the information signal is recorded and a keyword associated with a segmentation section is recorded, for each of the segmentation sections specified by two adjacent divisions detected using the feature amounts of the information signal, in such a manner as to be associated with the information signal and the segmentation section;

a user operation input detection section configured to detect operation input by a user;

a user evaluation value generator configured to generate a user evaluation value on the basis of the operation input so as to correspond to each of the segmentation sections in such a manner that the operation input by the user is monitored by monitoring detection output of the user operation input detection section and, when the detection output indicates a predetermined reproduction operation that does not request that the information signal be normally reproduced as the operation input by the user while the information signal is being normally reproduced, a user evaluation value in a negative direction is assigned to the operation input;

a keyword evaluation value accumulation and storage section configured to accumulate the user evaluation value for each of the keywords and store the accumulated evaluation value for each of the keywords in such a way that the user evaluation value for each of the segmentation sections, generated by the user evaluation value generator, is associated with the evaluation value of the keyword of the segmentation section;

a scheduling information obtaining section configured to receive transmission scheduling information containing information in the form of character information related to the information signal transmitted via the communication network; and a recommendation section configured to detect an information signal scheduled to be transmitted, the information signal containing a keyword having a large evaluation value among the evaluation values of the keywords stored in the keyword evaluation value accumulation and storage section, within the character information contained in the transmission scheduling information obtained by the scheduling information obtaining section, and configured to recommend the information signal to the user.

22. A reproduction apparatus comprising:

a reproduction section configured to read and reproduce an information signal from a recording medium on which the information signal is recorded and a keyword associated with a segmentation section is recorded, for each of the segmentation sections specified by two adjacent divisions detected using the feature amounts of the information signal, in such a manner as to be associated with the information signal and the segmentation section;

a user operation input detection section configured to detect operation input by a user;

a user evaluation value generator configured to generate a user evaluation value on the basis of the operation input so as to correspond to each of the segmentation sections in such a manner that the operation input by the user is monitored by monitoring detection output of the user operation input detection section and, when the detection output indicates a predetermined reproduction operation that does not request that the information signal be normally reproduced as the operation input by the user while the information signal is being normally reproduced, a user evaluation value in a negative direction is assigned to the operation input;

a keyword evaluation value accumulation and storage section configured to accumulate the user evaluation value for each of the keywords and store the accumulated evaluation value for each of the keywords in such a way that the user evaluation value for each of the segmentation sections, generated by the user evaluation value generator, is associated with the evaluation value of the keyword of the segmentation section; and a reproduction control section configured to control a reproduction mode for the segmentation section or a reproduction mode of the information signal containing the segmentation section on the basis of the keyword for each of the segmentation sections recorded on the recording medium and the evaluation value of the keyword stored in the keyword evaluation value accumulation and storage section.

* * * * *